United States Patent
Kanani et al.

(10) Patent No.: US 10,195,567 B2
(45) Date of Patent: *Feb. 5, 2019

(54) LAYERED TUBULAR MEMBRANES FOR CHROMATOGRAPHY, AND METHODS OF USE THEREOF

(71) Applicant: Natrix Separations, Inc., Burlington (CA)

(72) Inventors: Dharmeshkumar M. Kanani, Hamilton (CA); Navneet Sidhu, Mississauga (CA); Bradley A. Kachuik, Cambridge (CA); Charles H. Honeyman, Toronto (CA)

(73) Assignee: Natrix Separations Inc., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,891

(22) Filed: Jan. 22, 2018

(65) Prior Publication Data

US 2018/0141004 A1 May 24, 2018

Related U.S. Application Data

(63) Continuation of application No. 13/473,891, filed on May 17, 2012, now Pat. No. 9,873,088.
(Continued)

(51) Int. Cl.
*B01D 61/00* (2006.01)
*B01D 69/12* (2006.01)
*B01D 63/10* (2006.01)

(52) U.S. Cl.
CPC ...... *B01D 63/10* (2013.01); *B01D 2311/2626* (2013.01); *B01D 2313/12* (2013.01);
(Continued)

(58) Field of Classification Search
CPC ...... B01D 29/117; B01D 29/19; B01D 29/23; B01D 29/11; B01D 29/21; B01D 29/232;
(Continued)

(56) References Cited

U.S. PATENT DOCUMENTS

| 3,209,915 A | 10/1965 | Gutkowski |
| 3,417,870 A | 12/1968 | Bray |

(Continued)

FOREIGN PATENT DOCUMENTS

| CA | 1200158 A | 2/1986 |
| CA | 2054933 A1 | 6/1992 |

(Continued)

OTHER PUBLICATIONS

"The Water Molecule," Martin Chaplin, Apr. 3, 2001; printed from the internet on Apr. 21, 2011; <<http://xnet.rrc.mb.ca/rcharney/the%20water%20molecule.htm>>.

(Continued)

*Primary Examiner* — Pranav N Patel
(74) *Attorney, Agent, or Firm* — Foley Hong LLP

(57) ABSTRACT

Described are wrapped fluid treatment elements, comprising: a composite material; an interleaf; and an inner core; wherein the composite material and the interleaf form layers wrapped around the inner core. The composite material and interleaf may be wrapped in a spiral configuration around the inner core. The invention also relates to a method of separating a substance from a fluid, comprising the step of placing the fluid in contact with an inventive device or element, thereby adsorbing or absorbing the substance to the composite material contained therein.

16 Claims, 21 Drawing Sheets

Related U.S. Application Data

(60) Provisional application No. 61/486,959, filed on May 17, 2011.

(52) U.S. Cl.
CPC ...... *B01D 2313/14* (2013.01); *B01D 2313/40* (2013.01); *B01D 2313/90* (2013.01)

(58) Field of Classification Search
CPC ............ B01D 29/237; B01D 2201/325; B01D 63/10; B01D 63/062; B01D 63/103; B01D 69/10; B01D 69/02; B01D 2313/10; B01D 2313/143; B01D 2313/12; B01D 2313/14; B01D 2313/40; B01D 2313/90; B01D 2325/12; B01D 2239/0695; B01D 2311/2626
See application file for complete search history.

(56) References Cited

U.S. PATENT DOCUMENTS

| | | | |
|---|---|---|---|
| 3,473,668 | A | 10/1969 | Bunyard et al. |
| 3,623,610 | A | 11/1971 | Olsen et al. |
| 3,695,444 | A | 10/1972 | Iaconelli |
| 3,713,921 | A | 1/1973 | Fleischer et al. |
| 3,875,085 | A | 4/1975 | Bolto |
| 3,933,646 | A | 1/1976 | Kanamaru et al. |
| 3,939,105 | A | 2/1976 | Jones, Jr. et al. |
| 3,997,482 | A | 12/1976 | Turkova et al. |
| 4,104,125 | A | 8/1978 | Takechi et al. |
| 4,108,804 | A | 8/1978 | Seita et al. |
| 4,133,764 | A | 1/1979 | Bardin et al. |
| 4,170,540 | A | 10/1979 | Lazarz et al. |
| 4,198,238 | A | 4/1980 | Scheve |
| 4,224,415 | A | 9/1980 | Meitzner et al. |
| 4,230,697 | A | 10/1980 | Nishida et al. |
| 4,275,056 | A | 6/1981 | Takaku et al. |
| 4,377,481 | A | 3/1983 | Jakabhazy |
| 4,381,775 | A | 5/1983 | Nose' et al. |
| 4,397,892 | A | 8/1983 | Lorant et al. |
| 4,473,474 | A | 9/1984 | Ostreicher et al. |
| 4,504,583 | A | 3/1985 | Hasegawa et al. |
| 4,518,695 | A | 5/1985 | Hasegawa |
| 4,525,374 | A | 6/1985 | Vaillancourt |
| 4,525,527 | A | 6/1985 | Takeda et al. |
| 4,601,828 | A | 7/1986 | Gershoni |
| 4,678,844 | A | 7/1987 | Sakuragi et al. |
| 4,705,755 | A | 11/1987 | Hasegawa et al. |
| 4,790,942 | A | 12/1988 | Shmidt et al. |
| 4,814,077 | A | 3/1989 | Furuyoshi et al. |
| 4,836,928 | A | 6/1989 | Aoyagi et al. |
| 4,888,116 | A | 12/1989 | Cadotte et al. |
| 4,889,632 | A | 12/1989 | Svec et al. |
| 4,897,191 | A | 1/1990 | Langerak et al. |
| 4,923,610 | A | 5/1990 | Svec et al. |
| 4,944,879 | A | 7/1990 | Steuck |
| 4,952,349 | A | 8/1990 | Svec et al. |
| 4,966,851 | A | 10/1990 | Durance et al. |
| 4,969,997 | A | 11/1990 | Kluver et al. |
| 4,999,171 | A | 3/1991 | Kato et al. |
| 5,019,139 | A | 5/1991 | LaPack et al. |
| 5,019,270 | A | 5/1991 | Afeyan et al. |
| 5,059,659 | A | 10/1991 | Gregor et al. |
| 5,100,549 | A | 3/1992 | Langerak et al. |
| 5,114,582 | A | 5/1992 | Sandstrom et al. |
| 5,114,585 | A | 5/1992 | Kraus et al. |
| 5,122,558 | A | 6/1992 | Knobel et al. |
| 5,130,343 | A | 7/1992 | Frechet et al. |
| 5,137,633 | A | 8/1992 | Wang |
| 5,143,616 | A | 9/1992 | Pall et al. |
| 5,147,541 | A | 9/1992 | McDermott, Jr. et al. |
| 5,160,627 | A | 11/1992 | Cussler et al. |
| 5,176,832 | A | 1/1993 | Dorta et al. |
| 5,211,728 | A | 5/1993 | Trimmer |
| 5,221,477 | A | 6/1993 | Melcher et al. |
| 5,225,120 | A | 7/1993 | Graiver et al. |
| 5,227,063 | A | 7/1993 | Langerak et al. |
| 5,228,989 | A | 7/1993 | Afeyan et al. |
| 5,232,593 | A | 8/1993 | Pedersen et al. |
| 5,268,306 | A | 12/1993 | Berger et al. |
| 5,269,931 | A | 12/1993 | Hu et al. |
| 5,277,915 | A | 1/1994 | Provonchee et al. |
| 5,282,971 | A | 2/1994 | Degen et al. |
| 5,284,584 | A | 2/1994 | Huang et al. |
| 5,316,680 | A | 5/1994 | Frechet et al. |
| 5,317,932 | A | 6/1994 | Westlake, III et al. |
| 5,334,310 | A | 8/1994 | Frechet et al. |
| 5,384,042 | A | 1/1995 | Afeyan et al. |
| 5,403,482 | A | 4/1995 | Steere et al. |
| 5,409,515 | A | 4/1995 | Yamamoto et al. |
| 5,422,284 | A | 6/1995 | Lau |
| 5,433,861 | A | 7/1995 | Frawley et al. |
| 5,460,720 | A | 10/1995 | Schneider |
| 5,470,469 | A | 11/1995 | Eckman |
| 5,472,606 | A | 12/1995 | Steere et al. |
| 5,562,827 | A | 10/1996 | Schmidt et al. |
| 5,593,576 | A | 1/1997 | Girot et al. |
| 5,593,729 | A | 1/1997 | Frechet et al. |
| 5,599,453 | A | 2/1997 | Girot et al. |
| 5,607,586 | A | 3/1997 | Grangeon et al. |
| 5,646,001 | A | 7/1997 | Terstappen et al. |
| 5,647,979 | A | 7/1997 | Liao et al. |
| 5,648,390 | A | 7/1997 | Vander Meer et al. |
| 5,672,276 | A | 9/1997 | Girot et al. |
| 5,681,464 | A | 10/1997 | Larsson |
| 5,695,653 | A | 12/1997 | Gsell et al. |
| 5,723,601 | A | 3/1998 | Larsson et al. |
| 5,728,457 | A | 3/1998 | Frechet et al. |
| 5,733,452 | A | 3/1998 | Whitlock |
| 5,739,190 | A | 4/1998 | Hartmann et al. |
| 5,756,717 | A | 5/1998 | Paliwal et al. |
| 5,762,789 | A | 6/1998 | de los Reyes et al. |
| 5,780,688 | A | 7/1998 | Hoffmann et al. |
| 5,783,085 | A | 7/1998 | Fischel |
| 5,833,860 | A | 11/1998 | Kopaciewicz et al. |
| 5,897,779 | A | 4/1999 | Wisted et al. |
| 5,906,734 | A | 5/1999 | Girot et al. |
| 5,929,214 | A | 7/1999 | Peters et al. |
| 5,972,634 | A | 10/1999 | Tanzi et al. |
| 5,976,380 | A | 11/1999 | Moya |
| 6,033,784 | A | 3/2000 | Jacobsen et al. |
| 6,045,697 | A | 4/2000 | Girot et al. |
| 6,086,769 | A | 7/2000 | Kilambi et al. |
| 6,103,119 | A | 8/2000 | Clements et al. |
| 6,143,174 | A | 11/2000 | Graus et al. |
| 6,153,098 | A | 11/2000 | Bayerlein et al. |
| 6,186,341 | B1 | 2/2001 | Konstantin et al. |
| 6,190,557 | B1 | 2/2001 | Hisada et al. |
| 6,207,806 | B1 | 3/2001 | Brierley et al. |
| 6,258,276 | B1 | 7/2001 | Mika et al. |
| 6,271,278 | B1 | 8/2001 | Park et al. |
| 6,277,489 | B1 | 8/2001 | Abbott et al. |
| 6,331,253 | B1 | 12/2001 | Schrive et al. |
| 6,387,271 | B1 | 5/2002 | Geibel et al. |
| 6,391,200 | B2 | 5/2002 | Pulek et al. |
| 6,454,942 | B1 | 9/2002 | Shintani et al. |
| 6,461,513 | B1 | 10/2002 | Jen |
| 6,461,517 | B1 | 10/2002 | Miwa et al. |
| 6,475,071 | B1 | 11/2002 | Joslyn |
| 6,494,936 | B1 | 12/2002 | Peacock |
| 6,495,041 | B2 | 12/2002 | Taniguchi et al. |
| 6,613,234 | B2 | 9/2003 | Voute et al. |
| 6,623,631 | B1 | 9/2003 | Graus et al. |
| 6,635,104 | B2 | 10/2003 | Komkova et al. |
| 6,635,420 | B1 | 10/2003 | Hosel et al. |
| 6,709,598 | B1 | 3/2004 | Pearl |
| 6,766,817 | B2 | 7/2004 | da Silva et al. |
| 6,780,327 | B1 | 8/2004 | Wu et al. |
| 6,780,582 | B1 | 8/2004 | Wagner et al. |
| 6,824,679 | B1 | 11/2004 | Dzengeleski et al. |
| 6,824,975 | B2 | 11/2004 | Hubscher et al. |
| 6,851,561 | B2 | 2/2005 | Wu et al. |
| 6,884,345 | B1 | 4/2005 | Irgum et al. |
| 6,887,384 | B1 | 5/2005 | Frechet et al. |

(56) References Cited

U.S. PATENT DOCUMENTS

| | | | |
|---|---|---|---|
| 6,902,671 | B2 | 6/2005 | Cappia et al. |
| 6,911,148 | B1 | 6/2005 | Demmer et al. |
| 6,913,786 | B2 | 7/2005 | Proulx et al. |
| 6,918,404 | B2 | 7/2005 | Dias da Silva et al. |
| 6,926,823 | B2 | 8/2005 | Kallury et al. |
| 6,951,880 | B2 | 10/2005 | Roberts et al. |
| 6,953,686 | B1 | 10/2005 | Ramasubramanyan |
| 6,984,604 | B2 | 1/2006 | Cobb et al. |
| 6,986,847 | B2 | 1/2006 | Sirkar et al. |
| 7,048,855 | B2 | 5/2006 | de la Cruz |
| 7,066,586 | B2 | 6/2006 | da Silva et al. |
| 7,073,671 | B2 | 7/2006 | Charkoudian |
| 7,094,347 | B2 | 8/2006 | Wu et al. |
| 7,163,803 | B2 | 1/2007 | Hamon et al. |
| 7,189,771 | B2 | 3/2007 | Hsu |
| 7,247,370 | B2 | 7/2007 | Childs et al. |
| 7,284,668 | B2 | 10/2007 | Charkoudian |
| 7,285,255 | B2 | 10/2007 | Kadlec et al. |
| 7,316,919 | B2 | 1/2008 | Childs et al. |
| 7,351,335 | B2 | 4/2008 | Broens et al. |
| 7,410,581 | B2 | 8/2008 | Arnold et al. |
| 7,452,697 | B2 | 11/2008 | Luo et al. |
| 7,504,034 | B2 | 3/2009 | Minegishi et al. |
| 7,507,420 | B2 | 3/2009 | Ng et al. |
| 7,598,371 | B2 | 10/2009 | Willson et al. |
| 7,736,504 | B2 | 6/2010 | Fritze et al. |
| 7,824,548 | B2 | 11/2010 | DiLeo et al. |
| 7,879,758 | B2 | 2/2011 | Heidenreich et al. |
| 7,883,767 | B2 | 2/2011 | Childs et al. |
| 8,110,525 | B2 | 2/2012 | Xiao et al. |
| 8,206,958 | B2 | 6/2012 | Childs et al. |
| 8,211,682 | B2 | 7/2012 | Childs et al. |
| 8,383,782 | B2 | 2/2013 | Childs et al. |
| 9,873,088 | B2 | 1/2018 | Kanani et al. |
| 2001/0037982 | A1 | 11/2001 | Pulek et al. |
| 2002/0005383 | A1 | 1/2002 | Voute et al. |
| 2002/0148769 | A1 | 10/2002 | Deuschle et al. |
| 2003/0000890 | A1 | 1/2003 | Quick et al. |
| 2003/0006186 | A1 | 1/2003 | Pulek et al. |
| 2003/0155243 | A1 | 8/2003 | Sferrazza |
| 2003/0155290 | A1 | 8/2003 | Chanaud |
| 2003/0232895 | A1 | 12/2003 | Omidian et al. |
| 2004/0195164 | A1 | 10/2004 | Hirokawa et al. |
| 2004/0203149 | A1 | 10/2004 | Childs et al. |
| 2005/0133424 | A1 | 6/2005 | Bouvier et al. |
| 2006/0175256 | A1 | 8/2006 | Masten et al. |
| 2007/0212281 | A1 | 9/2007 | Kadlec et al. |
| 2008/0017578 | A1 | 1/2008 | Childs et al. |
| 2008/0035558 | A1 | 2/2008 | Shah |
| 2008/0156718 | A1 | 7/2008 | Larsen |
| 2008/0190836 | A1 | 8/2008 | Beppu et al. |
| 2008/0230488 | A1 | 9/2008 | Gutman et al. |
| 2008/0264867 | A1 | 10/2008 | Mika et al. |
| 2008/0312416 | A1 | 12/2008 | Childs et al. |
| 2008/0314831 | A1 | 12/2008 | Childs et al. |
| 2009/0107922 | A1 | 4/2009 | Zhang et al. |
| 2009/0200226 | A1 | 8/2009 | Straeffer et al. |
| 2010/0059443 | A1 | 3/2010 | Brellisford et al. |
| 2011/0006007 | A1 | 1/2011 | Kuruc et al. |
| 2011/0030382 | A1 | 2/2011 | Eadon et al. |
| 2011/0049042 | A1 | 3/2011 | Dileo et al. |
| 2017/0145053 | A1 | 5/2017 | Brellisford et al. |
| 2018/0141004 | A1 | 5/2018 | Kanani et al. |

FOREIGN PATENT DOCUMENTS

| | | |
|---|---|---|
| CA | 2173754 A1 | 4/1995 |
| CA | 2428280 | 5/2002 |
| DE | 39 18 430 A1 | 12/1990 |
| DE | 195 40 876 A1 | 5/1997 |
| DE | 199 43 921 | 1/2001 |
| EP | 105629 A2 | 4/1984 |
| EP | 0163146 A1 | 12/1985 |
| EP | 0316642 A2 | 5/1989 |
| EP | 0369769 A2 | 5/1990 |
| EP | 0506247 A2 | 9/1992 |
| EP | 0581544 A2 | 2/1994 |
| EP | 610755 A1 | 8/1994 |
| EP | 662340 A1 | 7/1995 |
| EP | 907397 A1 | 4/1999 |
| EP | 942251 A2 | 9/1999 |
| EP | 1163036 A1 | 12/2001 |
| EP | 1405828 A1 | 4/2004 |
| EP | 1609522 A2 | 12/2005 |
| EP | 1849516 A1 | 10/2007 |
| EP | 2 143 481 A1 | 1/2010 |
| JP | S61-163004 U | 10/1986 |
| JP | 62014903 | 1/1987 |
| JP | S62039636 A | 2/1987 |
| JP | S62-258702 A | 11/1987 |
| JP | H01070108 U | 5/1989 |
| JP | H01080048 A | 7/1989 |
| JP | H03143532 A | 6/1991 |
| JP | H06047259 A | 2/1994 |
| JP | 06100725 A | 4/1994 |
| JP | H08024598 A | 1/1996 |
| JP | H0852329 A | 2/1996 |
| JP | H08206474 A | 8/1996 |
| JP | H08281083 A | 10/1996 |
| JP | H8281084 A | 10/1996 |
| JP | H08295630 A | 11/1996 |
| JP | H0947639 A | 2/1997 |
| JP | H0999223 A | 4/1997 |
| JP | H09119684 A | 5/1997 |
| JP | H1076144 A | 3/1998 |
| JP | H10057780 A | 3/1998 |
| JP | 11033370 | 2/1999 |
| JP | H1157703 A | 3/1999 |
| JP | H09103661 A | 4/1999 |
| JP | 2000070683 A | 3/2000 |
| JP | 2000246067 A | 9/2000 |
| JP | 2000291988 A | 10/2000 |
| JP | 2001038155 A | 2/2001 |
| JP | 2001038157 A | 2/2001 |
| JP | 2001038158 A | 2/2001 |
| JP | 2001146404 A | 5/2001 |
| JP | 2001293337 A | 10/2001 |
| JP | 2002-166146 A | 6/2002 |
| JP | 2002186839 A | 7/2002 |
| JP | 2002248324 A | 9/2002 |
| JP | 2002273181 A | 9/2002 |
| JP | 2003144863 A | 5/2003 |
| JP | 2003225661 A | 8/2003 |
| JP | 2003251386 A | 9/2003 |
| JP | 2003326139 A | 11/2003 |
| JP | 2003326140 A | 11/2003 |
| JP | 2004067402 A | 3/2004 |
| JP | 2004089761 A | 3/2004 |
| JP | 2005211819 A | 8/2005 |
| JP | 2006021129 A | 1/2006 |
| JP | 2006102662 A | 4/2006 |
| JP | 2006150239 A | 6/2006 |
| JP | 2007111674 A | 5/2007 |
| JP | 2007136349 A | 6/2007 |
| JP | 2007253089 A | 10/2007 |
| JP | 2007313389 A | 12/2007 |
| JP | 2007313390 A | 12/2007 |
| JP | 5146647 B2 | 2/2013 |
| KR | 100236921 B1 | 1/2000 |
| KR | 1020080016740 A | 2/2008 |
| KR | 1020090033518 | 4/2009 |
| RU | 2236382 C2 | 9/2004 |
| WO | WO-87/06395 A1 | 10/1987 |
| WO | WO-90/04609 | 5/1990 |
| WO | WO-91/00762 | 1/1991 |
| WO | WO-91/14076 | 9/1991 |
| WO | WO-92/05595 A1 | 4/1992 |
| WO | WO-92/07899 | 5/1992 |
| WO | WO-93/07945 | 4/1993 |
| WO | WO-93/19115 A1 | 9/1993 |
| WO | WO-94/08686 A1 | 4/1994 |
| WO | WO-94/08713 | 4/1994 |
| WO | WO-94/09063 | 4/1994 |
| WO | WO-95/10346 | 4/1995 |

(56) References Cited

FOREIGN PATENT DOCUMENTS

| | | |
|---|---|---|
| WO | WO-97/17129 | 5/1997 |
| WO | WO-97/18904 | 5/1997 |
| WO | WO-97/019744 A1 | 6/1997 |
| WO | WO-98/00220 A1 | 1/1998 |
| WO | WO-98/01208 | 1/1998 |
| WO | WO-98/17377 | 4/1998 |
| WO | WO-98/35738 A1 | 8/1998 |
| WO | WO-99/13958 | 3/1999 |
| WO | WO-99/20378 | 4/1999 |
| WO | WO-00/12618 A1 | 3/2000 |
| WO | WO-2000/029098 A1 | 5/2000 |
| WO | WO-00/44485 | 8/2000 |
| WO | WO-00/50160 A1 | 8/2000 |
| WO | WO-00/50161 | 8/2000 |
| WO | WO-00/54866 | 9/2000 |
| WO | WO-00/69549 | 11/2000 |
| WO | WO-01/08792 A2 | 2/2001 |
| WO | WO-01/092607 A1 | 12/2001 |
| WO | WO-01/93980 | 12/2001 |
| WO | WO-02/05924 A1 | 1/2002 |
| WO | WO-02/05934 A2 | 1/2002 |
| WO | WO-02/16675 A2 | 2/2002 |
| WO | WO-02/28947 | 4/2002 |
| WO | WO-02/38257 | 5/2002 |
| WO | WO-02/096538 A1 | 12/2002 |
| WO | WO-03/008078 A2 | 1/2003 |
| WO | WO-03/049842 | 6/2003 |
| WO | WO-2004/009201 A2 | 1/2004 |
| WO | WO-2004/028660 | 4/2004 |
| WO | WO-2004/073843 A1 | 9/2004 |
| WO | WO-2004/110132 A2 | 12/2004 |
| WO | WO-2005037917 A1 | 4/2005 |
| WO | WO-2005/097304 | 10/2005 |
| WO | WO-2006/015495 | 2/2006 |
| WO | WO-2006/091167 A1 | 8/2006 |
| WO | WO-2007/038542 A2 | 4/2007 |
| WO | WO-2007/110203 A1 | 10/2007 |
| WO | WO-2010/027955 A2 | 3/2010 |
| WO | WO-2010/062454 A1 | 6/2010 |
| WO | WO-2010/117598 A2 | 10/2010 |
| WO | WO-2010/129171 A2 | 11/2010 |
| WO | WO-11/025698 A1 | 3/2011 |

OTHER PUBLICATIONS

Afeyan, N.B. et al., "Flow-through particles for the high-performance liquid chromatographic separation of biomolecules: perfusion chromatography," J Chromatogr, 519:1-29 (1990).
Akhtar, S. et al., "Coatings reduce the fouling of microfiltration membranes," J Memb Sci, 107:209-18 (1995).
Alpert, A.J. et al., "Preparation of a Porous Microparticulate Anion-Exchange Chromatography Support for Proteins," J Chrom, 185:375-92 (1979).
Altomare, A. et al., "Methacrylic polymers containing permanent dipole azobenzene chromophores spaced from from the main chain. 13C NMR spectra and photochromic properties," Macromol Chem Phys, 200:601-8 (1999).
Altomare, A. et al., "Synthesis and polymerization of amphiphilic methacrylates containing permanent dipole azobenzene chromophores," J Polym Sci Pol Chem, 39:2957-77 (2001).
Anderson, J.L. et al., "Model for Hydrodynamic Thickness of Thin Polymer Layers at Solid/Liquid Interfaces," Langmuir, 7:162-6 (1991).
Arshady, R., "In the name of particle formation," Colloid Surface A, 153:325-33 (1999).
Barbucci, R. et al., "Synthesis, chemical and rehological characterization of new hyaluronic acid-based hydrogels," J Biomater Sci-Polymer Edn, 11:383-99 (2000).
Barton, A.F.M., CRC Handbook of Solubility Parameters and Other Cohesion Parameters, 2nd Ed., CRC Press, Boca Raton, FL, Chapter 14, pp. 405-464 (1991).
Boschetti, E., "Advanced sorbents for preparative protein separation purposes," J Chromatogr A, 658:207-36 (1994).
Brandrup et al. (edited by), Polymer Handbook Chapter VII, Wiley and Sons, New York (1999).
Cabasso, I. et al., "Composite Hollow Fiber Membranes," J Appl Polym Sci, 23:1509-25 (1979).
Chanda, M. et al., "A new method of gel-coating polyethyleneimine (PEI) on organic resin beads. High capacity and fast kinetics of PEI gel-coated on polystyrene," Ind Eng Chem Res, 40:1624-32 (2001).
Charcosset, C., "Purification of proteins by membrane chromatography," J Chem Technol Biot, 71:95-110 (1998).
Chen et al., "Comparison of standard and new generation hydrophobic interaction chromatography resins in the monoclonal antibody purification process," Journal of Chromatography A, 1177:272-281 (2008).
Childs, R.F. et al., "Formation of pore-filled microfiltration membranes using a combination of modified interfacial polymerization and grafting," J Polym Sci Pol Chem, 40:242-50 (2002).
Childs, R.F., et al., The design of high performance, gel-filled nanofiltration membranes, in a New Insights into Membrane Science and Technology: Polymeric, Inorganic and Biofunctional Membranes@ Elsevier, Edit. A Butterfield and D Bhattacharyya, (2003) p. 353-375.
Choi et al., "Separation of proteins on polymeric stationary phases grafted with various amine groups" J Chromatogr A, 987: 323-330 (2003).
Claesson, P.M. et al., "Adsorption and interaction of a graft copolymer of poly(ethylene imine) and poly(ethylene oxide)," Colloid Surface, 112:131-9 (1996).
Claesson, P.M. et al., "Surface properties of poly(ethylene imine)-Coated mica surfaces—salt and pH effects," Colloid Surface, 123-124:341-53 (1997).
Dickson, J.M. et al., "Development of a coating technique for the internal structure of polypropylene microfiltration membranes," J Membrane Sci, 148:25-36 (1998).
Diogo et al., "Purification of a Cystic Fibrosis Plasmid Vector for Gene Therapy Using Hydrophobic Interaction Chromatography," Biotechnology Bioengineering, 68(5):576-583 (2000).
Dudley, L.Y. et al., "Coatings for the prevention of fouling of microfiltration membranes," Chem Eng Res Des, 71(part A):327-8 (1993).
Eisenbach, C.D., "Isomerization of aromatic azo chromophores in poly(ethyl acrylate) networks and photomechanical effect," Polymer, 21:1 175-9 (1980).
Erim, F.B. et al., "Performance of a physically adsorbed high-molecular-mass polyethyleneimine layer as coating for the separation of basic proteins and peptides by capillary electrophoresis," J Chromatogr, 708:356-61 (1995).
Erim, F.B., "Separation of phenols by capillary electrophoresis in a polyethylenemine-coated capillary," Microchem J, 57:283-7 (1997).
European Search Report dated Apr. 7, 2009 from 05 732 196.0.
European Search Report dated Nov. 17, 2009 from EP 09 17 2742.0.
European Search Report dated Nov. 18, 2009 from EP 09 17 2746.1.
Ghosh, R. et al., "Analysis of protein transport and polarization through membranes using pulsed sample injection technique," J Membrane Sci, 175:75-84 (2000).
Ghosh, R. et al., "Parameter scanning ultrafiltration: rapid optimisation of protein separation," Biotechnol Bioeng, 81:673-82 (2003).
Ghosh, R., "Bioseparation using suppored liquid membrane chromatography," J Membrane Sci, 192:243-7 (2001).
Ghosh, R., "Fractionation of biological macromolecules using carrier phase ultrafiltration," Biotechnol Bioeng, 74(1):1-11 (2001).
Ghosh, R., "Protein separation using membrane chromatography: opportunities and challenges," J Chromatogr, 952:13-27 (2002).
Grulke, E.A., Polymer Handbook, 4th Ed. (1999), Brandrup, J., et al., Wiley-Interscience, New York, Chapter VII, pp. 675, 697 and 711.
Happel et al., "Low Reynolds number hydrodynamics," Noordhoff Int Publ, Leyden, p. 393 (1973).
Hatch et al., "Preparation and use of snake-cage polyelectrolytes," Ind Eng Chem, 49:1812-9 (1957).
Hoffer, E. et al., "Hyperfiltration in charged membranes: the fixed charge model," Desalination, 13:1280-90 (1967).

(56) References Cited

OTHER PUBLICATIONS

Hvid, K.B. et al., "Preparation and characterization of a new ultrafiltration membrane," J Membrane Sci, 53:189-202 (1990).
Hydrophobic Interaction Chromatography, Principles and Methods, Amersham Pharmacia Biotech, Ed. AB, pp. 1-104 (1993).
Idol, W.K. et al., "Effects of adsorbed polyelectrolytes on convective flow and diffusion in porous membranes," J Memb Sci, 28:269-86 (1986).
Iki et al., "A New Chiral Stationary Phase for Gas Chromatography by Use of a Chiral Thiacalix[4]arene Derivative," Chemistry Letters, 27(10):1065-1066 (1998).
International Search Report dated Apr. 16, 2010 from PCT/US2009/055582.
International Search Report dated Apr. 4, 2011 from PCT/IB2010/003049.
International Search Report dated Aug. 5, 2005 (mailed Aug. 23, 2005) from PCT/CA05/000880.
International Search Report dated Feb. 1, 2013 from PCT/US2012/038318.
International Search Report dated Jun. 21, 2005 (mailed Jul. 20, 2005) from PCT/CA05/000518.
International Search Report dated Sep. 18, 2014, from PCT/IB2014/001022.
International Search Report for PCT/US2011/051364 dated Apr. 26, 2012.
Inukai, M. et al., "Preparation and characterization of hyaluronate—hydroxyethyl acrylate blend hydrogel for controlled release device," Chem Pharm Bull, 48:850-4 (2000).
Iritani et al., "Concentration of proteinaceous solutions with superabsorbent hydrogels," Separ Sci Technol, 28(10):1819-1836 (1993).
Jacobsen, C. et al., "Soft x-ray spectroscopy from image sequences with sub-100 nm spatial resolution," J Microsc, 197(Pt 2):173-84 (2000).
Jensen, M. et al., "Loading into and electro-stimulated release of peptides and proteins from chondroitin 4-sulphate hydrogels," Eur J Pharm Sci, 15:139-48 (2002).
Ji, Chun-Nuan, et al.; "Studies on synthesis and properties of snake—cage type chelating resin of carboxymethyl cellulose-ethylenediamine-B-62", XP002522863 retrieved from STN Database accession No. 2003:314324 (abstract) & Linchan Huaxue Yu Gongye, 23(1), 35-38 Coden: LHYGD7; Issn: 0253-2417, 2003.
Jiang, W. et al., "Pore-filled cation-exchange membranes containing poly(styrenesulfonic acid) gels," Desalination, 159:253-66 (2003).
Kabra et al., "Synthesis of fast response, temperature-sensitive poly (N-isopropylacrylamide) gel," Polymer Communications, 32(11):322-323 (1991).
Kagatani, S. et al., "Electroresponsive pulsatile depot delivery of insulin from poly(dimethylaminopropylacrylamide) gel in rats," J Pharm Sci, 86(11):1273-7 (1997).
Kapur et al., "Hydrodynamic permeability of hydrogels stabilized within porous membranes," Ind Eng Chem Res, 35:3179-3185 (1996).
Kapur, V., "Transport in polymer/gel-modified micropores," Ph.D. Thesis, Carnegie-Mellon University, 56:229 (1996).
Kato et al., "Hydrophobic interaction chromatography at low salt concentration for the capture of monoclonal antibodies," Journal of Chromatography A, 1036:45-50 (2004).
Kawai, T. et al., "Extension and shrinkage of polymer brush grafted onto porous membrane induced by protein binding," Macromolecules, 33:1306-9 (2000).
Kim, J.H. et al., "Rapid temperature/pH response of porous alginate-g-poly(N-isopropylacrylamide) hydrogels," Polymer, 43:7549-58 (2002).
Kim, J.T. et al., "Diffusion and flow through polymer-lined micropores," Ind Eng Chem Res, 30:1008-16 (1991).
Kim, J.T. et al., "Hindered transport through micropores with adsorbed polyelectrolytes," J Membrane Sci, 47:163-82 (1989).

Konitturi, K. et al., "Modeling of the salt and pH effects on the permeability of grafted porous membranes," Macromolecules, 29:5740-6 (1996).
Kumar, G.S. et al., "Chelating copolymers containing photosensitive functionalities. 3. Photochromism of cross-linked polymers," Macromolecules, 18(8):1525-30 (1985).
Liu, H.C. et al., "Breakthrough of lysozyme through an affinity membrane of cellulose-cibacrom blue," AIChE J, 40:40-9 (1994).
Liu, Q. et al., "Preparation of macroporous poly(2-hydroxyethyl methacrylate) hydrogels by enhanced phase separation" (2000) Biomaterials, 21, p. 2163-2169.
Lozinsky, V. et al., "The potential of polymeric cryogels in bioseparation," Bioseparation, 10:163-88 (2002).
Mallik et al., "High-Performance Affinity Monolith Chromatography: Development and Evaluation of Human Serum Albumin Columns," Analytical Chemistry, 76(23): 7013-7022 (2004).
McNeff, C. et al., "High-performance anion exchange of small anions with polyethyleneimine-coated porous zirconia," J Chromatogr A, 684:201-11 (1994).
Merhar et al., "Methacrylate monoliths prepared from various hydrophobic and hydrophilic monomers—Structural and chromatographic characteristics," Journal of Separation Science, 26:322-330 (2003).
Mika et al., "Calculation of the hydrodynamic permeability of gels and gel-filled microporous membranes," Ind Eng Chem Res, 40:1694-1705 (2001).
Mika, A.M. et al., "A new class of polyelectrolyte-filled microfiltration membranes with environmentally controlled porosity," J Membrane Sci, 108:37-56 (1995).
Mika, A.M. et al., "Acid/base properties of poly(4-vinylpyridine) anchored within microporous membranes," J Membrane Sci, 152:129-40 (1998).
Mika, A.M. et al., "Chemical valves based on poly(4-vinylpyridine)-filled microporous membrane," J Membrane Sci, 153:45-56 (1999).
Mika, A.M. et al., "Poly(4-vinylpyridine)-filled microfiltration membranes: physicochemical properties and morphology," J Membrane Sci, 136:221-32 (1997).
Mika, A.M. et al., "Porous, polyelectrolyte-filled membranes: effect of cross-linking on flux and separation," J Membrane Sci, 135:81-92 (1997).
Mika, A.M. et al., "Salt separation and hydrodynamic permeability of a porous membrane filled with pH-sensitive gel," J Membrane Sci, 206:19-30 (2002).
Mika, A.M. et al., "Ultra-low pressure water softening with pore-filled membranes," Desalination, 140:265-75 (2001).
Mika, A.M. et al., "Ultra-low pressure water softening: a new approach to membrane construction," Desalination, 121:149-58 (1999).
Murakami, R. et al., "Properties of poly(vinyl alcohol)/silica hybrid gel particles," J Mater Sci Lett, 14:937-8 (1995).
Murdan, S. et al., "Electro-responsive drug delivery from hydrogels," J Control Release, 92:1-17 (2003).
Nagaoka, S., "Mechanical properties of composite hydrogels," Polym J, 21:847-50 (1989).
Nakanishi, K. et al., "Porous gel coatings obtained by phase separation in ORMOSIL system," Mater Res Soc Symp Proc, 628:CC7.6.1-CC7.6.11 (2000).
Okano et al., "Intelligent biointerface: remote control for hydrophilic-hydrophobic property of the material surfaces by temperature," presented at the Third ICIM/ECSSM '96, Lyon '96, pp. 34-41.
Oxley, H.R. et al., "Macroporous hydrogels for biomedical applications: methodology and morphology," (1993) Biomaterials, 14(14):1064-72 (1993).
Padmavathi et al., "Structural characteristics and swelling behavior of poly(ethylene glycol) diacrylate hydrogels," Macromolecules, 29:1976-9 (1996).
Pandey, A.K. et al., "Formation of pore-filled ion-exchange membranes with in-situ crosslinking: poly(vinylbenzyl ammonium salt)-filled membranes," J Polym Sci Pol Chem, 39:807-20 (2001).
Park et al., "Estimation of Temperature-Dependent Pore Size in Poly(N-isopropylacrylamide) Hydrogel Beads," Biotechnology Prog., 10:82-86 (1994).

(56) References Cited

OTHER PUBLICATIONS

Petsch, D. et al., "Selective adsorption of endotoxin inside a polycationic network of flat-sheet microfiltration membranes," J Mol Recognit, 11:222-30 (1998).
Rabelo et al., "Structure and properties of styrene-divinylbenzene copolymers," Polym Bull, 33:479, 487 and 493 (1994).
Roque, A.C.A. et al., "Affinity-based methodologies and ligands for antibody purification: advances and perspectives," J Chromatogr A, 1160:44-55 (2007).
Rounds, M.A. et al., "Poly(styrene-divinylbenzene)-based strong anion-exchange packing material for high-performance liquid chromatography of proteins," J Chromatogr, 397:25-38 (1987).
Saito, K., "Charged polymer brush grafted onto porous hollow-fiber membrane improves separation and reaction in biotechnology," Separ Sci Technol, 37(3):535-554 (2002).
Sata, T. et al., "Modification of properties of ion exchange membranes," Coll Sci, 256:757-69 (1978).
Schaefer, D.W. et al., "Dynamics of semiflexible polymers in solution," Macromolecules, 13:1280-90 (1980).
Smets, G. et al., "Chemical reactions in solid polymeric systems. Photomechanical phenomena," Pure Appl Chem, 39:225-38 (1974).
Smets, G. et al., "Photochromic phenomena in the solid phase," Adv Polym Sci, 50:17-44 (1983).
Smets, G. et al., "Photomechanical effects in photochromic systems," Pure Appl Chem, 50:845-56 (1978).
Stachera, D. et al., "Acid recovery using diffusion dialysis with poly(4-vinylpyridine)-filled microporous membranes," J Membrane Sci, 148:119-27 (1998).
Supplementary European Seach Report dated Apr. 26, 2007 (mailed May 8, 2007) from EP 05 732 196.0.
Supplementary European Seach Report dated Apr. 7, 2009 (mailed May 8, 2009) from EP 05 75 3128.7.
Supplementary European Search Report dated Aug. 20, 2013, from EP 09 81 2101.
Supplementary European Search Report dated Jul. 4, 2014, from EP 10 82 9596.
Supplementary European Search Report dated Oct. 8, 2014, from EP 12786567.3.
Svec et al., "Molded Rigid Monolithic Porour Polymers: An Inexpensive, Efficient, and Versatile Alternative to Beads for the Design of Materials for Numerous Applications," Ind. Eng. Chem. Res., 38:34-48 (1999).
Svec, F. et al., "Reactive macroporous membranes based on glycidyl methacrylate-ethylene dimethacrylate copolymer for high-performance membrane chromatography of proteins," Angew Makromol Chem, 188:167-76 (1991).
Svec, F., et al., "Kinetic Control of Pore Formation in Macroporous Polymers. Formation of "Molded" Porous Materials with High Flow Characteristics for Separation or Catalysis", Chem. Mater. (1995) vol. 7, p. 707-715.
Tennikov, M.B. et al., "Effect of porous structure of macroporous polymer supports on resolution in high-performance membrane chromatography of proteins," J Chromatogr A, 798:55-64 (1998).
Tennikova et al., "High-performance membrane chromatography of proteins, a novel method of protein separation," Chromatogr, 555: 97-107 (1991).

Tennikova et al., "High-performance membrane chromatography. A novel method of protein separation," J Liq Chromatogr, 13: 63-70 (1990).
Tennikova et al., "High-performance membrane chromatography: highly efficient separation method for proteins in ion-exchange, hydrophobic interaction and reversed-phase modes," J Chromatogr, 646: 279-288 (1993).
Ultrafiltration, Nanofiltration and Reverse Osmosis, SDWF, <<www.safewater.org>>; on Apr. 20, 2010, during prosecution of U.S. Appl. No. 11/547,736; no date provided.
Van Krevelen, D.W., "Cohesive Properties and Solubility," Properties of Polymers, 2nd Ed., Elsevier, Amsterdam, Chapter 7, p. 129-159 (1976).
Vijayalakshmi, M.A., "Antibody Purification Methods," Applied Biochemistry and Biotechnology, 75:93-102 (1998).
Viklund et al., "Fast ion-exchange HPLC of proteins using porous poly(glycidyl methacrylate-co-ethylene dimethacrylate) monoliths grafted with poly(2-acrylamido-2-methyl-1-propanesulfonic acid)," Biotechnol Progr, 13:597-600 (1997).
Von Gottberg, A., "New high-performance spacers in electrodialysis reversal (EDR) systems," Proceedings—Annual Conference, American Water Works Association (1998) p. 215-229, vol. B, Water Resources.
Wang et al., "Polymeric Porogens Used in he Preparation of Novel Monodispersed Macroporous Polymeric Separation Media for High-Performance Liquid Chromatography," Anal. Chem., 64:1232-1238 (1992).
Wang, L., "Internal surface coating and photochemical modification of polypropylene microfiltration membrane", Ph.D. Thesis, McMaster University, Hamilton, Ont., Canada, (1997).
Warwick, T. et al., "A scanning transmission x-ray microscope for materials science spectromicroscopy at the advanced light source," Rev Sci Instrum, 69(8):2964-73 (1998).
Warwick, T. et al., "Soft x-ray spectromicroscopy development for materials science at the advanced light source," J Electron Spectrosc, 84:85-98 (1997).
Webber, R.M. et al., "Hydrodynamic studies of adsorbed diblock copolymers in porous membranes," Macromolecules, 23:1026-34 (1990).
Xie et al., "Rigid porous polyacrylamide-based monolithic columns containing butyl methacrylate as a separation medium for the rapid hydrophobic interaction chromatography of proteins," Journal of Chromatography, 775:65-72 (1997).
Yang et al., "Hollow fiber membrane chromatography: A novel analytical system for trace metal separation," Analytica Chimia Acta, 369:17-20 (1998).
Yang, H., "Analysis of protein purification using ion-exchange membranes," Ind Eng Chem, 38:4044-50 (1999).
Yonese, M. et al., "Visoelastic properties of poly (vinyl alcohol)/alginate snake-cage hydrogels and interpenetrating hydrogels," Polym J, Society of Polymer Science, Tokyo, JP, 24(4):395-404 (1992).
Youtube video titled "Membrane Chromatography for MAB Purification—Natrix Separations 2010," uploaded Jan. 18, 2011 and retrieved from the Internet on Aug. 15, 2014 (URL:https://www.youtube.com/watch?v=uKTEby4n21g).
Zhang, H.Q. et al., "Synthesis and characterization of novel photochromic side-chain liquid crystalline polymethacrylates containing para-nitroazobenzene group," Eur Polym J, 34(10):1521-9 (1998).

Figure 1

| Wrapped Design - Chemistry | Spacer used | Number of Layers ||||||| Buffers and protein used |
|---|---|---|---|---|---|---|---|---|---|
| | | 2 (Membrane volume = 5 mL) |||| 4 (Membrane volume = 10 mL) |||| |
| | | Binding capacity (mg/mL) | Protein bound (g) | Back pressure (PSi) | Flow rate (mL/min) & Membrane volume | Binding capacity (mg/mL) | Protein bound (g) | Back pressure (PSi) | Flow rate (mL/min) & Membrane volume | |
| S | No Spacer | 143 | 0.726 | 4 | 50 mL/min (10 MV) | 53 | 0.528 | 21 | 70 mL/min (7 MV) | Lysozyme in 10 mM MES buffer; pH 5.5 |
| | Mesh (1 mm) | | | | | 45 | 0.45 | 4 | 100 mL/min (10 MV) | |
| | Lab Substrate | | | | | 227 | 2.5 | 14 | 50 mL/min (5MV) | |
| | Lab like Substrate (more open) | | | | | 214 | 2.2 | 18 | 50 mL/min (5MV) | |
| | Lab like Substrate (Sealed) MV = 8.5 mL | | | | | 212 | 1.8 | 22 | 50 mL/min (5MV) | |

Figure 2

| Membrane Chemistry | | 10 layers (Membrane volume = 25 mL) | | | |
|---|---|---|---|---|---|
| | Spacer | Binding capacity (mg/mL) | Protein bound (g) | Back pressure (psi) | Flow rate (ml/min) & Membrane volume |
| S | No Spacer | | | | |
| | Mesh (1 mm) | | | | |
| | Lab Substrate | | | | |
| | Lab like Substrate (more open) | | | | |
| | Lab like Substrate (Sealed) MV = 8.5 mL | | | | |
| | Capsule spacer | 9 | 0.24 | 15 | 75 mL/min (3 MV) |

Figure 3

| Membrane Chemistry | Spacer | 2 layers (Membrane volume = 5 mL) | | | | 4 layers (Membrane volume = 10 mL) | | | |
|---|---|---|---|---|---|---|---|---|---|
| | | Binding capacity (mg/mL) | Protein bound (g) | Back pressure (PSi) | Flow rate (mL/min) & Membrane volume | Binding capacity (mg/mL) | Protein bound (g) | Back pressure (PSi) | Flow rate (mL/min) & Membrane volume |
| Q | No Spacer | 202 | 1.03 | 3.5 | 70 mL/min (14 MV) | 194 | 2 | 11 | 100 mL/min (10 MV) |
| | Mesh (1 mm) | | | | | | | | |
| | Mesh (0.450 mm) | | | | | | | | |
| | Mesh (1 mm) | | | | | | | | |

Figure 4

| Membrane Chemistry | Spacer | 10 layers (Membrane volume = 25 mL) | | | 7 layers (Membrane volume = 18 mL) | | | |
|---|---|---|---|---|---|---|---|---|
| | | Binding capacity (mg/mL) | Protein bound (g) | Back pressure (psi) | Flow rate (mL/min) & Membrane volume | Binding capacity (mg/mL) | Protein bound (g) | Back pressure (psi) | Flow rate (mL/min) & Membrane volume |
| Q | No Spacer | 15 | 0.38 | 24.5 | 50 mL/min (2 MV) | | | | |
| | Mesh (1 mm) | 205 (before 10% breakthrough) | 5.2 | 6.8 | 100 mL/min (4 MV) | | | | |
| | Mesh (0.450 mm) | | | | | 240 | 4.2 | 12 | 150 mL/min (8 MV) |
| | Mesh (1 mm) | 300 (at 10% breakthrough) | 8 | 7.1 | 100 mL/min (4 MV) | | | | |

Figure 5

| Wrapped Design - Chemistry | Spacer used ; protein and buffer used | 4 layers (Membrane volume = 10 mL) | | | |
|---|---|---|---|---|---|
| | | Binding capacity (mg/mL) | Protein bound (g) | Back pressure (PSi) | Flowrate (mL/min) & Membrane volume |
| C | No Spacer; gamma globulins in 85 mM sodium acetate buffer; pH 5 | 84 | 0.84 | 12 | 50 mL/min (5 MV) |
| | Capsule spacer; gamma globulins in 85 nM sodium acetate buffer; pH 5 | 88 | 0.88 | 12 | 100 mL/min (10 MV) |
| | Capsule spacer; lysozyme in 20 mM phosphate buffer; pH 8 | 234 | 2.3 | 20 | 25 mL/min (2MV) |

Figure 6

| Membrane chemistry | Lot # | Lot Release Binding capacity (mg/mL) |
|---|---|---|
| Q membrane | 100420 QAP-2 | 218 |
| S membrane | 101012 SAP | 213 |
| C membrane | 110119CAP | 118 (hIgG) |
| C membrane | 110119CAP | 145 (Gamma globulins in sodium acetate buffer; pH 5) |

Figure 8

| Order No. | Description | Connector | Quantity | Bed volume [ml] | Typical protein binding capacity* [g] | Rec. flow rate [l/min] |
|---|---|---|---|---|---|---|
| Sartobind Q | | | | | | |
| 92IEXQ42DN-11 | Sartobind Q SingleSep nano 1 ml | Luer female | 1 | 1 | 0.029 | 0.03 |
| 92IEXQ42DN-11--A | Sartobind Q SingleSep nano 1 ml | Luer female | 4 | 1 | 0.029 | 0.03 |
| 92IEXQ42D4-OO--A | Sartobind Q SingleSep mini capsules | hose barb | 4 | 7 | 0.2 | 0.2 |
| 92IEXQ42D4-SS--A | Sartobind Q SingleSep mini capsules | sanitary | 4 | 7 | 0.2 | 0.2 |
| 92IEXQ42D9-OO--A | Sartobind Q SingleSep 5" capsules | hose barb | 4 | 70 | 2 | 1.9 |
| 92IEXQ42D9-SS--A | Sartobind Q SingleSep 5" capsule | sanitary | 4 | 70 | 2 | 1.9 |
| 92IEXQ42D1-SS | Sartobind Q SingleSep 10" capsules | sanitary | 1 | 180 | 5.3 | 5 |
| 92IEXQ42D2-SS | Sartobind Q SingleSep 20" capsule | sanitary | 1 | 360 | 10.6 | 10 |
| 92IEXQ42D3-SS | Sartobind Q SingleSep 30" capsule | sanitary | 1 | 540 | 16 | 15 |
| 92IEXQ42DC3SS | Sartobind Q SingleSep mega capsule | sanitary | 1 | 1620 | 48 | 50 |

Figure 9

Sartobind S

| | | | | | |
|---|---|---|---|---|---|
| 921EXS42DN-11 | Sartobind S SingleSep nano 1 ml | Luer female | 1 | 1 | 0.025 | 0.03 |
| 921EXS42DN-11—A | Sartobind S SingleSep nano 1 ml | Luer female | 4 | 1 | 0.025 | 0.03 |
| 921EXS42D4-D0—A | Sartobind S SingleSep mini capsules | hose barb | 4 | 7 | 0.175 | 0.2 |
| 921EXS42D4-SS—A | Sartobind S SingleSep mini capsules | sanitary | 4 | 7 | 0.175 | 0.2 |
| 921EXS42D9-D0—A | Sartobind S SingleSep 5" capsules | hose barb | 4 | 70 | 1.75 | 1.9 |
| 921EXS42D9-SS—A | Sartobind S SingleSep 5" capsules | sanitary | 4 | 70 | 1.75 | 1.9 |
| 921EXS42D1-SS | Sartobind S SingleSep 10" capsule | sanitary | 1 | 180 | 4.6 | 5 |
| 921EXS42D3-SS | Sartobind S SingleSep 30" capsule | sanitary | 1 | 540 | 14 | 15 |

Figure 10

| Order No. | Description | Connector | Quantity | Bed volume [ml] | Typical protein binding capacity* [g] | Rec. flow rate [l/min] |
|---|---|---|---|---|---|---|
| Sartobind STIC PA | | | | | | |
| 92STPA42DN-11--A | Sartobind STIC PA nano 1 ml | Luer female | 4 | 1 | 0.05 | 0.03 |
| 92STPA42D9-FF--A | Sartobind STIC PA 5" capsule | sanitary | 4 | 70 | 3.5 | 1.9 |
| 92STPA42D1-SS | Sartobind STIC PA 10" capsule | sanitary | 1 | 180 | 9 | 5 |
| 92STPA42D3-SS | Sartobind STIC PA 30" capsule | sanitary | 1 | 540 | 27 | 15 |
| 92STPA42DC3SS | Sartobind STIC PA mega capsule | sanitary | 1 | 1620 | 81 | 50 |

Figure 11

| | *Typical dynamic binding capacity at 10% breakthrough [mg/cm2] | [mg/ml] | Reference protein | Loading buffer |
|---|---|---|---|---|
| S | 0.7 | 25 | hen egg white lysozyme | 10 mM potassium phosphate, pH 7.0 |
| Q | 0.8 | 29 | bovine serum albumin | 20 mM Tris/HCl, pH 7.5 |
| Sartobind STIC PA | 1.4 | 50 | bovine serum albumin | 20 mM Tris/HCl with 150 ml NaCl, pH 7.5 |

Figure 12
(a) 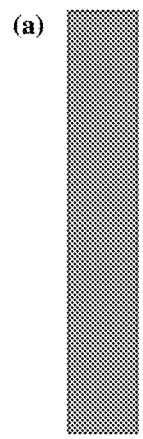
(b) 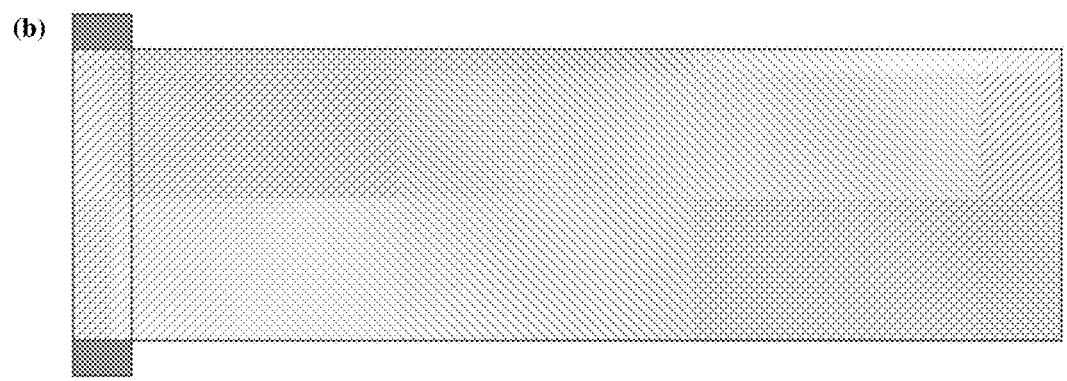
(c) 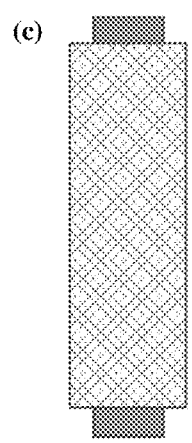

Figure 13
(a) 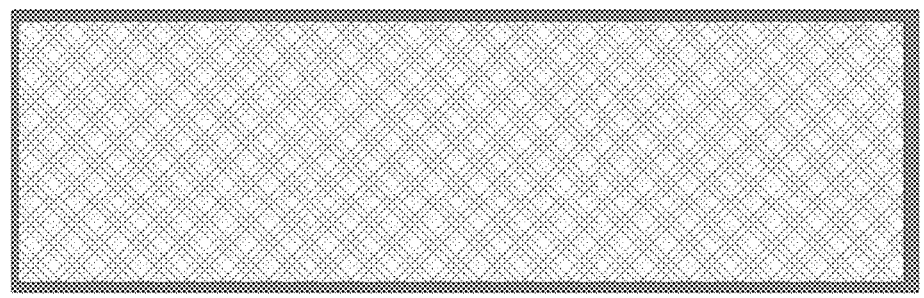
(b) 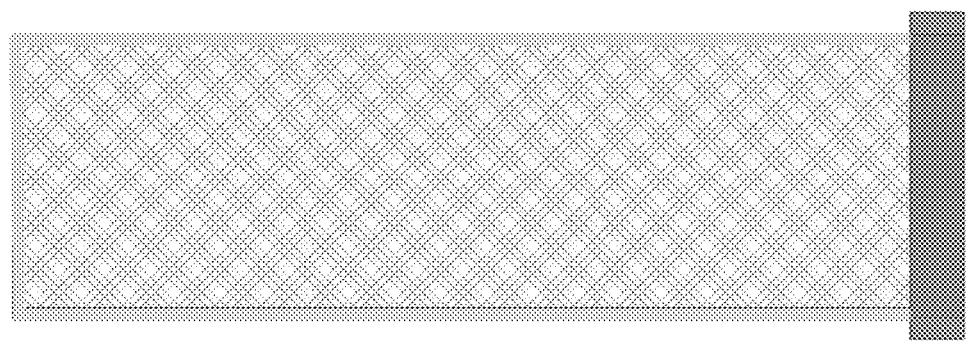
(c) 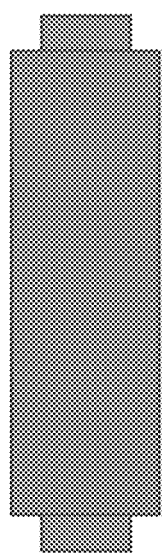

Figure 14
(a)
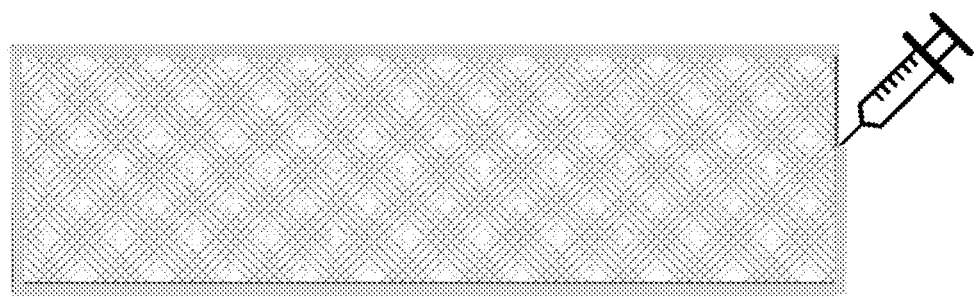
(b)
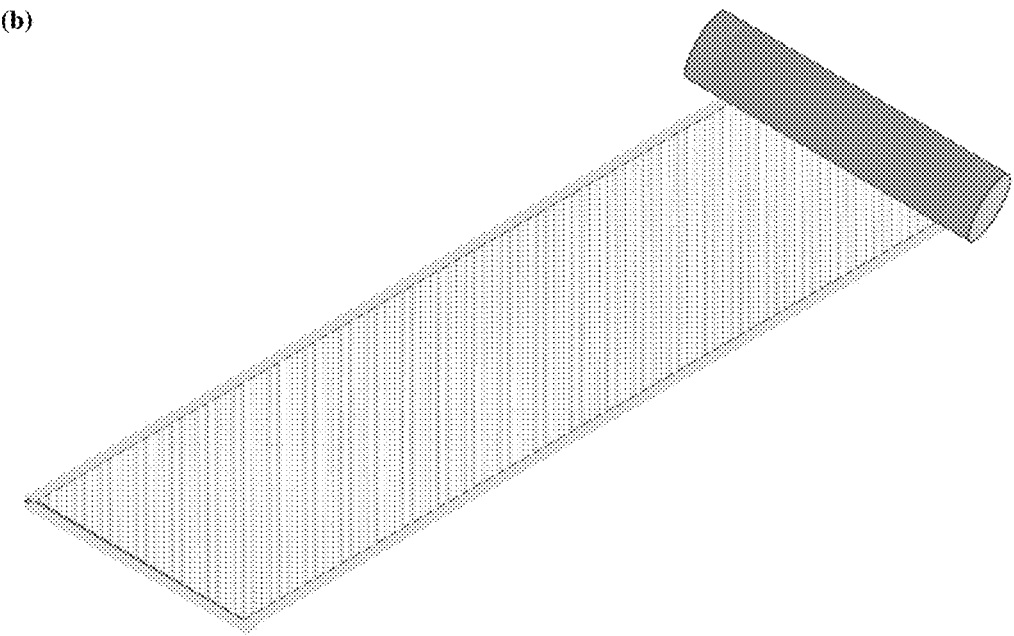

Figure 16
(a)
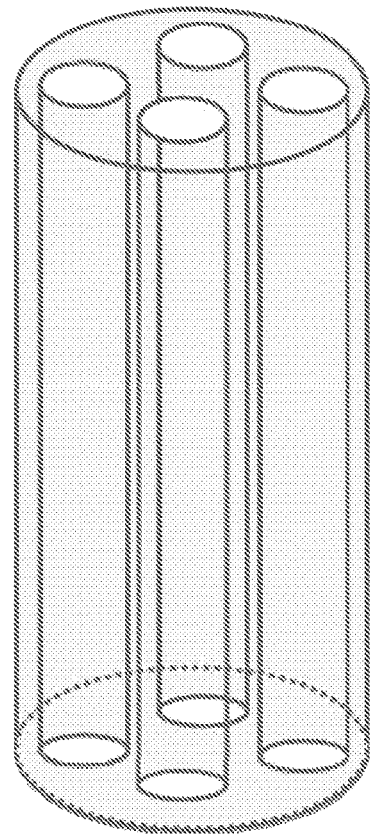
(b)
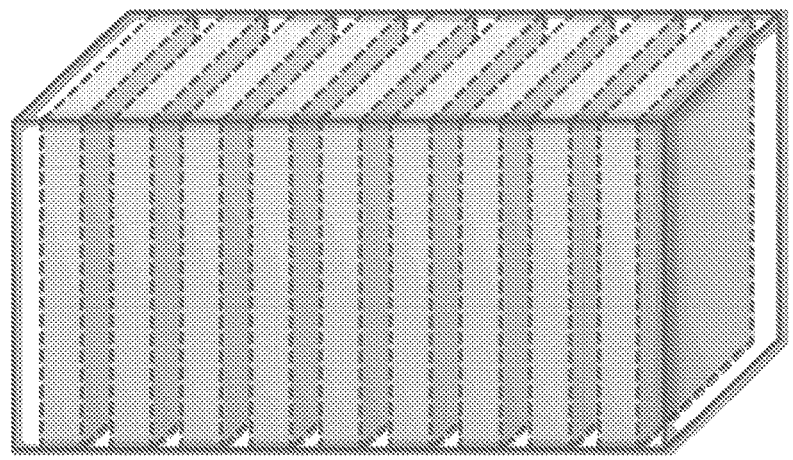

Figure 20

| Device | Membrane Type | Should Achieve<br>Cut Disk BC (mg/mL)<br>*Lot Specific* | Actually Achieved<br>Measured Device BC (mg/mL) |
|---|---|---|---|
| 2.5" Capsule | S | 235 | 157 |
| 4 Layer Wrapped | S | 213 | 227 |

Figure 21

| Interleaf Name (Lingo) | Material | Key features |
|---|---|---|
| Lab substrate | Non-woven polypropylene (supplied by Hollingsworth and Vose) | • 250 micron thickness<br>• 70-80% porosity<br>• Compressible |
| Lab like substrate | Spunbound polypropylene (Basis weight: 0.86 oz/yd$^2$ | • 150 micron thickness<br>• > 90% porosity<br>• Compressible |
| Capsule spacer | Spunbound polypropylene, Flat bond (similar to UNIPRO FX material from Midwest Filtration) | • 210 micron thickness<br>• 80-90% porosity<br>• Compressible |
| Midwest filter | AVSPUN 70 GSM POLYPRO (supplied by Midwest Filtration) | • 365 micron thickness<br>• 75-85% porosity<br>• Compressible |
| Mesh (0.45 mm) | Extruded Netting (similar to Naltex product line from DelStar Technologies, Inc) | • 450 micron thickness<br>• > 98% porosity<br>• Non-compressible |
| Mesh (0.45 mm) | Extruded Netting (similar to Naltex product line from DelStar Technologies, Inc) | • 1000 micron thickness<br>• > 98% porosity<br>• Non-compressible |
| Paper | Unbound glass or Cellulose | • 50 - 250 micron thickness<br>• 50-80% porosity<br>• Compressible |

LAYERED TUBULAR MEMBRANES FOR CHROMATOGRAPHY, AND METHODS OF USE THEREOF

RELATED APPLICATIONS

This application is a continuation application of U.S. patent application Ser. No. 13/473,891 filed on May 17, 2012, now U.S. Pat. No. 9,873,088, which claims the benefit of priority to U.S. Provisional Patent Application Ser. No. 61/486,959, filed May 17, 2011.

BACKGROUND OF THE INVENTION

Membrane-based water treatment processes were first introduced in the 1970s. Since then, membrane-based separation technologies have been utilized in a number of other industries. In the pharmaceutical and biotechnology industries, the use of preparative chromatography, direct flow filtration (DFF) and tangential flow filtration (TFF), including micro-, ultra-, nano-filtration and diafiltration are well-established methods for the separation of dissolved molecules or suspended particulates. Ultrafiltration (UF) and microfiltration (MF) membranes have become essential to separation and purification in the manufacture of biomolecules. Biomolecular manufacturing, regardless of its scale, generally employs one or more steps using filtration. The attractiveness of these membrane separations rests on several features including, for example, high separation power, and simplicity, requiring only the application of pressure differentials between the feed stream and the permeate. This simple and reliable one-stage filtering of the sample into two fractions makes membrane separation a valuable approach to separation and purification.

For optimal results, any method of fluid separation demands careful attention to filter porosity and filter area, as well as required differential pressures and selected pump rates. However, filtration devices tend to clog when used over an extended period of time and must be timely replaced. Clogging of a filtration device occurs: (1) when the membrane pores become obstructed, typically with trapped cells, particulate matter, cell debris or the like, or (2) when the feed channel becomes obstructed by solids or colloidal material and/or cell debris. This clogging of the feed channel or membrane pores results in a decreased liquid flow across the porous filter membrane. The result is a change in system pressure which, if not properly addressed, runs the risk of serious detriment to the operation which incorporates the filtration procedure.

As such, the choice of membrane in each of the filtration techniques is critical to the efficiency and success of the separation. Composite membranes with high specificity and high binding capacity have been described in U.S. Pat. No. 7,316,919, and US Patent Application Publication Nos. 2008/0314831, 2008/0312416, 2009/0029438, 2009/0032463, 2009/0008328, 2009/0035552, 2010/0047551, and 2010/0044316, which are hereby incorporated by reference in their entirety. These materials are highly versatile and can be designed for specific separation situations.

However, upon commercialization, the use of these composite membranes in typical device configurations often led to lower than expected binding capacities for the device. Therefore, there exists a need for a device configuration that will exploit the high throughput capabilities of these membranes, without sacrificing performance or scalability.

SUMMARY OF THE INVENTION

In certain embodiments, the invention relates to a fluid treatment element comprising:

a composite material;
an interleaf; and
an inner core,
wherein the composite material and the interleaf form layers around the inner core.

In certain embodiments, the invention relates to a fluid treatment device comprising
a housing unit, wherein the housing unit comprises
(a) a first opening and a second opening;
(b) a fluid flow path between the first opening and the second opening; and
(c) a fluid treatment element comprising composite material and interleaf forming layers around an inner core, wherein the fluid treatment element is oriented across the fluid flow path such that a fluid entering the first opening must flow through at least one layer of composite material and at least one layer of interleaf before exiting the second opening.

In certain embodiments, the invention relates to a fluid treatment device comprising
a housing unit, wherein the housing unit comprises
(a) a first opening and a second opening;
(b) a fluid flow path between the first opening and the second opening; and
(c) a fluid treatment element comprising composite material and interleaf forming layers around an inner core, wherein the fluid treatment element is oriented across the fluid flow path such that a fluid entering the first opening must flow through at least one layer of composite material and at least one layer of interleaf before reaching the inner core and exiting the second opening.

In certain embodiments, the invention relates to a method, comprising the step of:
contacting a first fluid comprising a substance with a composite material of any one of the above-mentioned fluid treatment elements, thereby adsorbing or absorbing the substance onto the composite material.

BRIEF DESCRIPTION OF THE FIGURES

FIG. 1 depicts tabulated results of protein adsorption using various wrapped elements of the invention with a strong cation exchange (S) membrane and different interleaf materials ("spacer").

FIG. 2 depicts tabulated results of protein adsorption using various wrapped elements of the invention with a strong cation exchange (S) membrane and different interleaf materials ("spacer"). The protein adsorbed was lysozyme in 10 mM MES buffer at pH 5.5.

FIG. 3 depicts tabulated results of protein adsorption using various wrapped elements of the invention with a strong anion exchange (Q) membrane and different interleaf materials ("spacer"). The protein adsorbed was bovine serum albumin (BSA) in 25 mM Tris buffer at pH 8.1.

FIG. 4 depicts tabulated results of protein adsorption using various wrapped elements of the invention with a strong anion exchange (Q) membrane and different interleaf materials ("spacer"). The protein adsorbed was bovine serum albumin (BSA) in 25 mM Tris buffer at pH 8.1.

FIG. 5 depicts tabulated results of protein adsorption using various wrapped elements of the invention with a weak cation exchange (C) membrane and different interleaf materials ("spacer").

FIG. 6 depicts a summary of the membranes used in FIGS. 1-5; the binding capacities indicate binding capacity of the membrane when used in a normal cut-disk membrane device, not when pleated or wrapped.

FIG. 8 depicts inferior binding capacities of various commercially-available products with different fluid treatment elements.

FIG. 9 depicts inferior binding capacities of various commercially-available products with different fluid treatment elements.

FIG. 10 depicts inferior binding capacities of various commercially-available products with different fluid treatment elements.

FIG. 11 depicts inferior binding capacity of a commercially-available product with a different fluid treatment element, in comparison to S and Q flat, cut-disk membrane.

FIG. 12 depicts (a) an inner core; (b) the inner core being wrapped with a screen using hot melt in order to assist in uniform flow collection; and (c) the wrapped inner core material.

FIG. 13 depicts (a) a membrane sheet with interleaf; (b) the membrane sheet with interleaf being wrapped around an inner core; and (c) a wrapped fluid treatment element with adhesive (silicone II* clear) applied on all the edges of membrane sheet.

FIG. 14 depicts alternative views of interleaf on top of a membrane sheet.

FIG. 16 depicts alternative embodiments comprising multiple wrapped fluid treatment elements in one device.

FIG. 20 depicts a comparison between a fluid treatment device of the invention (wrapped fluid treatment element, bottom row) and a capsule device (pleated membrane element); pleating the membrane causes lower than expected binding capacity, while using a wrapped membrane increases expected binding capacity.

FIG. 21 is a summary of some of the properties of exemplary interleaf materials for use in the present invention.

DETAILED DESCRIPTION OF THE INVENTION

Overview

Figure 7:
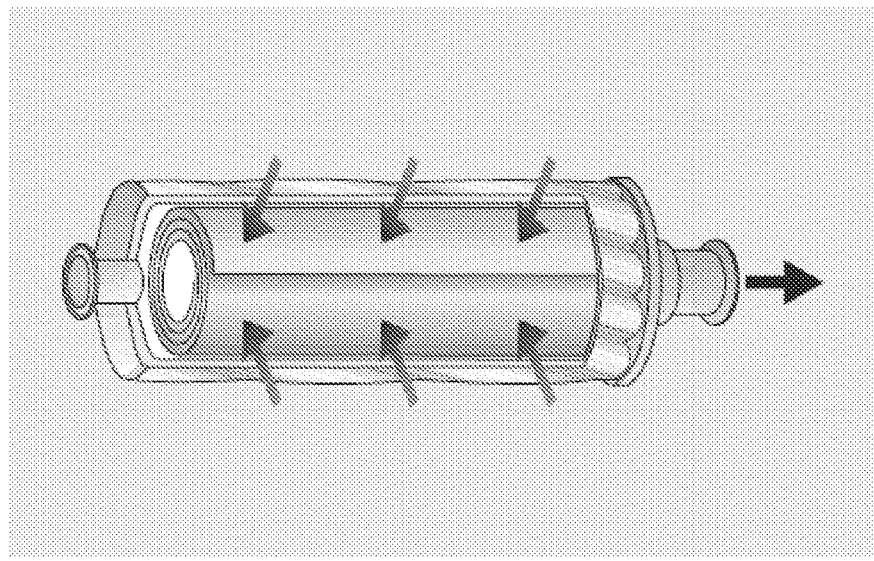
FIG. 7 depicts a cross-section of a fluid treatment device of the invention. The wrapped fluid treatment element is visible; the arrows indicate direction of the fluid flow through the membrane.
Figure 15:
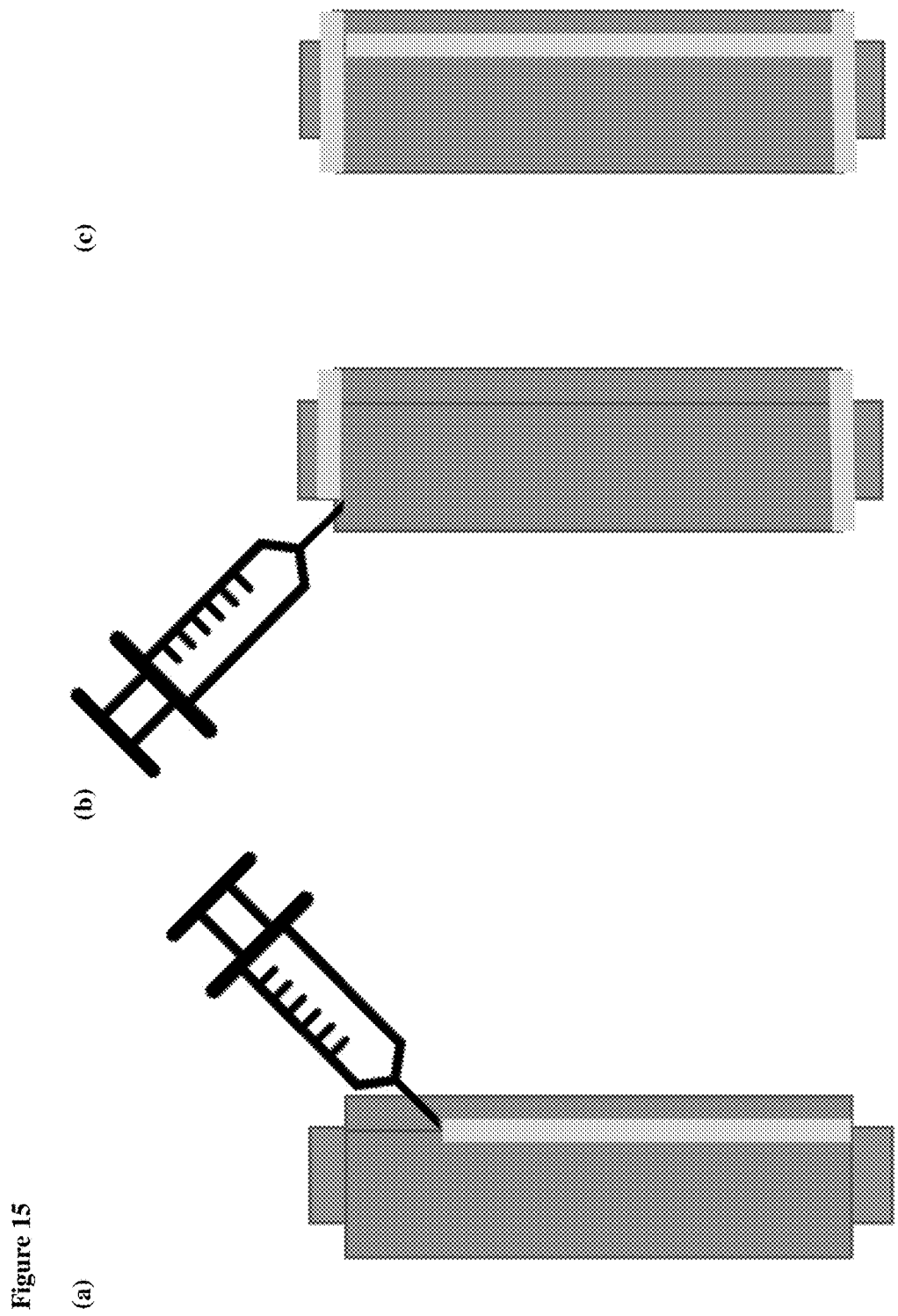
FIG. 15 depicts (a) the sealing of the whole edge of the top layer with glue to make sure no leak occurs; (b) the sealing of the ends using silicone II* clear glue; and (c) a completed exemplary wrapped fluid treatment element.
Figure 17:
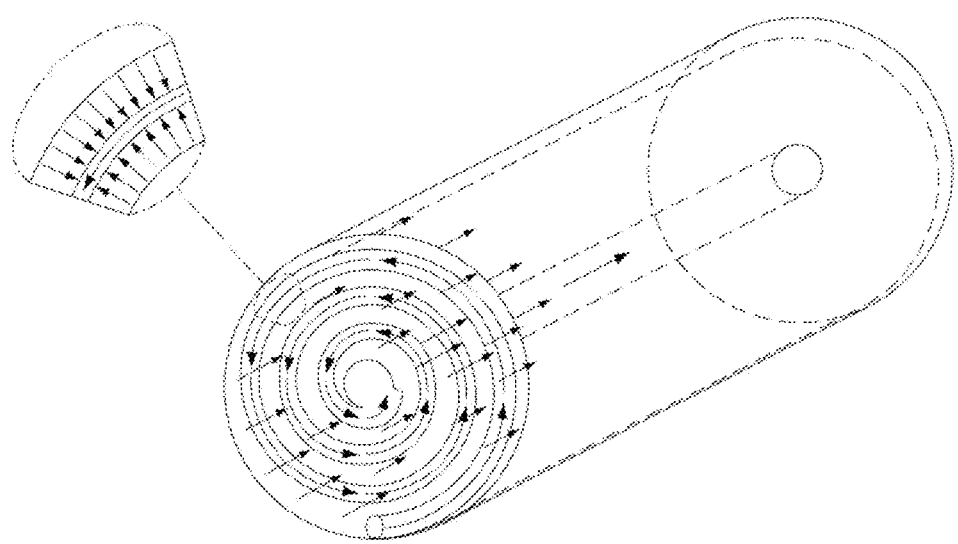
FIG. 17 depicts an alternative embodiment—a spiral wound fluid treatment element.
Figure 18:
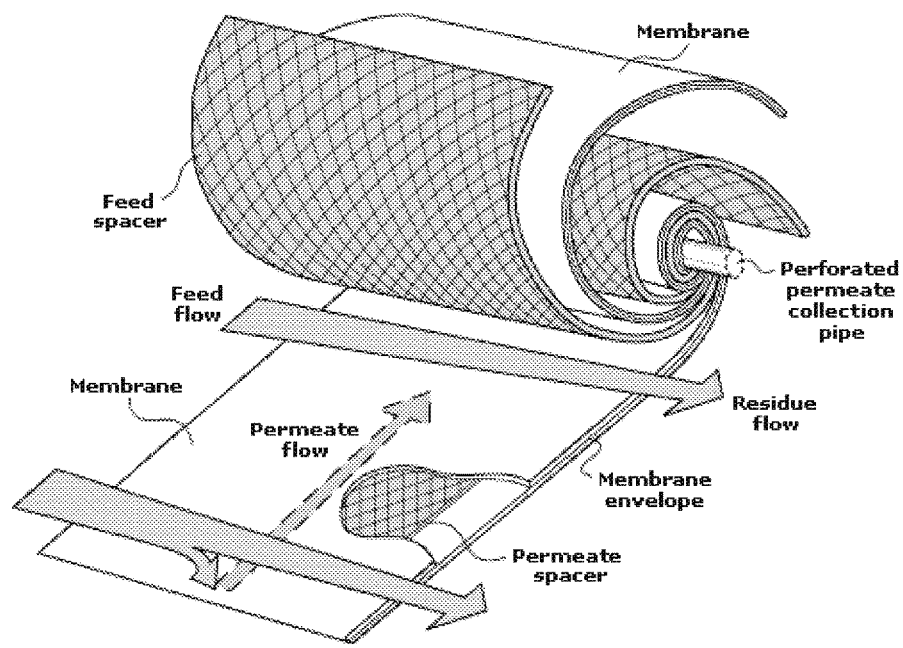
FIG. 18 depicts an exemplary configuration of a spiral wound device. There are three series of concentric envelopes, wherein each envelope has a spacer material inside and three of the sides are sealed. Each envelope is separated by a feed spacer. Fluid flow is directed such that raw fluid travels on the outside of each envelope and is forced through the membrane. The permeate travels along the permeate spacer to the permeate collection pipe.
Figure 19:
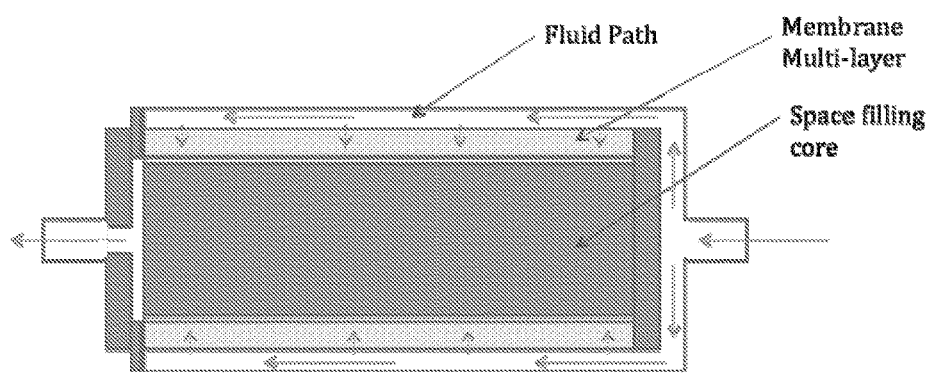
FIG. 19 depicts a cross-section of an exemplary fluid treatment device of the invention.

Certain macroporous cross-linked composite materials lose some level of performance upon being pleated and placed in a fluid treatment device. See FIG. 20. Therefore, in certain embodiments, the invention relates to a wrapped fluid treatment element with a design that allows a macroporous cross-linked composite material to be packed inside a device without any crease or pleat. In certain embodiments, the wrapped fluid treatment element of the invention may be suitable for even brittle membranes, for example a membrane comprising Protein A functionality.

In certain embodiments, membrane stacking (or wrapping around inner core) improves the breakthrough binding capacity of the device on the membrane volume basis as most of the layers in membrane stack reach saturation binding capacity by the time last layer reach breakthrough binding capacity.

In certain embodiments, the invention relates to a device that displays superior performance in comparison to know devices. In certain embodiments, the devices may tolerate about 10× to about 100× higher throughput than resins. In certain embodiments, the devices may display up to about 25× higher binding capacity than existing chromatographic membranes and resins.

In certain embodiments, the invention relates to a device that is scalable and produces predictable results in the transitions from Lab to Pilot to Production, unlike conventional resin products. In certain embodiments, the invention relates to a device that is inexpensive and easy to manufacture.

In certain embodiments, the superior mechanical strength of the devices and the inherent hydrophilicity of the composite membranes lead to longer in-process product lifetimes and more consistent performance.

In certain embodiments, the invention relates to a device that may be available as a single use or multi-cycle disposable unit. This flexibility may eliminate costly and time-consuming cleaning and storage validation. Furthermore, the devices of the invention enable simple process and may improve regulatory compliance.

In certain embodiments, the invention relates to separation processes that may require reduced buffer usage. In certain embodiments, using devices of the present invention may eliminate the need for column cleaning, equilibration, or storage in expensive buffers. In certain embodiments, the devices of the invention may tolerate higher concentration feed stream, so no dilution may be needed.

In certain embodiments, using the devices described herein may lower capital expenses and may offer significant operational cost savings for a client. In certain embodiments, the devices of the invention may have a lower initial cost and faster delivery. In certain embodiments, the devices allow for lower staffing requirements and reduced maintenance costs.

In certain embodiments, the invention relates to a device with a small footprint. In certain embodiments, the devices of the invention exhibit higher binding capacity and require less floor space than typical resin bed chromatography devices.

Definitions

For convenience, before further description of the present invention, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

In describing the present invention, a variety of terms are used in the description. Standard terminology is widely used in filtration, fluid delivery, and general fluid processing art.

The articles "a" and "an" are used herein to refer to one or to more than one (i.e., to at least one) of the grammatical object of the article. By way of example, "an element" means one element or more than one element.

The term "associated with" as used herein in such phrases as, for example, "an inorganic metal oxide associated with an stabilizing compound," refers to the presence of either weak or strong or both interactions between molecules. For example weak interactions may include, for example, electrostatic, van der Waals, or hydrogen-bonding interactions. Stronger interactions, also referred to as being chemically bonded, refer to, for example, covalent, ionic, or coordinative bonds between two molecules. The term "associated with" also refers to a compound that may be physically intertwined within the foldings of another molecule, even when none of the above types of bonds are present. For example, an inorganic compound may be considered as being in association with a polymer by virtue of existing within the interstices of the polymer.

The terms "comprise" and "comprising" are used in the inclusive, open sense, meaning that additional elements may be included.

The term "including" is used to mean "including but not limited to." "Including" and "including but not limited to" are used interchangeably.

The term "polymer" is used to mean a large molecule formed by the union of repeating units (monomers). The term polymer also encompasses copolymers.

The term "co-polymer" is used to mean a polymer of at least two or more different monomers. A co-polymer can be comprised of a cross-linker and a monomer, if the cross-linker is a difunctional monomer.

The term "two phase fluid" is used to mean a fluid comprising a liquid phase in which either substantially solid particles are dispersed therethrough, or a first liquid phase in which droplets or particles of a second liquid phase immiscible with such first liquid phase are dispersed through such first liquid phase. A "multiphase fluid" is used to mean a fluid comprising a first liquid phase in which at least one additional second solid or liquid phase is dispersed therethrough.

The term "particle" is used to mean a discreet liquid droplet or a solid object, with a characteristic dimension such as a diameter or length of between about one nanometer, and about one-tenth of a meter.

The term "particle size" is used to mean a number-average or weight-average particle size as measured by conventional particle size measuring techniques well known to those skilled in the art, such as dynamic or static light-scattering, sedimentation field-flow fractionation, photon-correlation spectroscopy, or disk centrifugation. By "an effective average particle size of less than about 1000 nm" it is meant that at least about 90% of the particles have a number-average or weight-average particle size of less than about 1000 nm when measured by at least one of the above-noted techniques. The particular size of particles in a fluid being processed will depend upon the particular application.

The term "interstices" is used to mean a space, especially a small or narrow one, between things or parts.

The term "dispersion" is used to mean any fluid comprising a liquid phase in which substantially solid particles are suspended, and remain suspended, at least temporarily.

The term "slurry" is used to mean any fluid comprising a liquid phase in which substantially solid particles are present. Such particles may or may not be suspended in such fluid.

The term "emulsion" is used to mean any fluid comprising a first liquid phase within which droplets or particles of a substantially liquid second phase are suspended, and remain suspended, at least temporarily. In reference to discreet entities of a second liquid phase in a first liquid phase, the terms "droplets" and "particles" are used interchangeably herein.

The term "crossflow" in reference to filtration is used to mean a filtration configuration in which a flowing fluid is directed along the surface of a filter medium, and the portion of fluid that passes through such filter medium has a velocity component which is "cross-wise", i.e., perpendicular to the direction of the fluid flowing along the surface of such filter medium.

The term "tangential filtration" is used to mean a filtration process in which a flowing fluid is directed substantially parallel (i.e., tangential) to the surface of a filter medium, and a portion of fluid passes through such filter medium to provide a permeate. The terms "tangential filtration" and "crossflow filtration" are often used interchangeably in the art.

The term "permeate" is used to mean the portion of the fluid that passes through the filter medium and out through a first outlet port in the filter device that is operatively connected to such filter medium. The term "decantate" is used to mean the portion of the fluid that flows along the surface of the filter medium, but does not pass through such filter medium, and passes out through a second outlet port in the filter device that is operatively connected to such filter medium.

Crossflow filtration and tangential filtration are well known filtration processes. Reference may be had to, e.g., U.S. Pat. Nos. 5,681,464, 6,461,513; 6,331,253, 6,475,071, 5,783,085, 4,790,942, the disclosures of which are incorporated herein by reference. Reference may also be had to "Filter and Filtration Handbook", 4th Ed., T. Christopher Dickenson, Elsevier Advanced Technology, 1997, the disclosure of which is incorporated herein by reference.

The term "average pore diameter" of the macroporous cross-linked gel may be understood by one of ordinary skill in the art as being determined by any suitable method. For example, average pore diameter may be estimated by environmental scanning electron microscopy (ESEM) images of the surface. ESEM can be a very simple and useful technique for characterising microfiltration membranes. A clear and concise picture of the membrane can be obtained in terms of the top layer, cross-section and bottom layer; the porosity and pore size distribution can be estimated from the photographs.

Alternatively, average pore diameter of the macroporous cross-linked gel may be calculated indirectly, from the measurement of flux ($Q_{H2O}$) through a flat cut-disk membrane. The hydrodynamic Darcy permeability, k (m$^2$), of the membrane was calculated from the following equation $$k = \frac{Q_{H_2O} \eta \delta}{3600 d_{H_2O} \Delta P}$$

where $\eta$ is the water viscosity (Pa·s), $\delta$ is the membrane thickness (m), $d_{H2O}$ is the water density (kg/m$^3$), and $\Delta P$ (Pa) is the pressure difference at which the flux, $Q_{H2O}$, was measured.

The hydrodynamic Darcy permeability of the membrane was used to estimate an average hydrodynamic radius of the pores in the porous gel. The hydrodynamic radius, $r_h$, is defined as the ratio of the pore volume to the pore wetted surface area and can be obtained from the Carman-Kozeny equation given in the book by J. Happel and H. Brenner, Low Reynolds Number Hydrodynamics, Noordhof Int. Publ., Leyden, 1973, p. 393:

$$k = \frac{\varepsilon r_h^2}{K}$$

where K is the Kozeny constant and ε is the membrane porosity (or volume porosity of the composite material). It is necessary to assume a value for the Kozeny constant and for the purpose of these calculations with the inventive membranes, the inventors assume a value of 5. The porosity of the membrane was estimated from porosity of the support by subtracting the volume of the gel polymer.

Hydrodynamic radius ($r_h$) is 0.5×pore radius ($r_p$); pore radius ($r_p$) is 0.5×pore diameter (pore size).

The "volume porosity" of the support member is determined by a simple calculation. For example, for a support member made with polypropylene, the external dimensions of the support member are measured, and the aggregate volume is calculated [for example, for a flat, circular disk: V=$\pi r^2 h$, the volume of the support member if it were solid, or not porous]. The mass of the support member is then determined. Because the density of polypropylene is known or can be determined from the Polymer Handbook, edited by Brandrup et al., Chapter VII, Wiley and Sons, New York, 1999, the volume porosity is calculated as in the following example:

volume porosity={(volume of support member if solid)−[(mass of support member)/(density of polypropylene)]}/(volume of support member if solid).

In this calculation, the void volume of the support member is =(volume of external dimensions of support member)−[(mass of support member)/(density of polypropylene)]. For example, the density of polypropylene=0.91 g/cm³.

The volume porosity of the composite material, ε, is an experimentally-determined value for each composite material. It is calculated by mass. The macroporous cross-linked gel is incorporated into the void volume of the support member. The mass of the incorporated gel is measured after drying to a constant weight. The partial specific volume of the polymer is known or can be determined from the Polymer Handbook, edited by Brandrup et al., Chapter VII, Wiley and Sons, New York, 1999. The maximum volume that the gel could occupy is the void volume of the support member (calculated as described above). The volume porosity of the gel is calculated ε={(void volume of support member)−[(mass of gel)×(partial specific volume of gel polymer)]}/(void volume of support member)

Exemplary Devices

In certain embodiments, the invention relates to a fluid treatment device comprising
a housing unit, wherein the housing unit comprises
(a) a first opening and a second opening;
(b) a fluid flow path between the first opening and the second opening; and
(c) a wrapped fluid treatment element comprising composite material and interleaf forming layers wrapped around an inner core,
wherein the wrapped fluid treatment element is oriented across the fluid flow path such that a fluid entering the first opening must flow through at least one layer of composite material and at least one layer of interleaf before exiting the second opening.

In certain embodiments, the invention relates to a fluid treatment device comprising
a housing unit, wherein the housing unit comprises
(a) a first opening and a second opening;
(b) a fluid flow path between the first opening and the second opening; and
(c) a wrapped fluid treatment element comprising composite material and interleaf forming layers wrapped around an inner core,
wherein the wrapped fluid treatment element is oriented across the fluid flow path such that a fluid entering the first opening must flow through at least one layer of composite material and at least one layer of interleaf before reaching the inner core and exiting the second opening.

In certain embodiments, the invention relates to any one of the above-mentioned fluid treatment devices, wherein the layers of composite material and interleaf are alternating layers of composite material and interleaf (that is, (composite material-interleaf)$_x$ or (interleaf-composite material)$_x$). In certain embodiments, the invention relates to any one of the above-mentioned fluid treatment devices, wherein the layers of composite material and interleaf are arranged (interleaf-first composite material-second composite material)$_x$ or (first composite material-second composite material-interleaf)$_x$. In certain embodiments, the invention relates to any one of the above-mentioned fluid treatment devices, wherein the layers of composite material and interleaf are arranged in a combination of the aforementioned arrangements. In certain embodiments, the first composite material and the second composite material are identical.

In certain embodiments, the invention relates to any one of the above-mentioned fluid treatment devices, wherein the inner core is a cylinder; the layer immediately adjacent to the inner core is a first layer of interleaf; and the first opening or the second opening is operably connected to the first layer of interleaf.

In certain embodiments, the invention relates to any one of the above-mentioned fluid treatment devices, wherein the inner core is a cylinder; the layer immediately adjacent to the inner core is a first layer of interleaf; and the first opening is operably connected to the first layer of interleaf.

In certain embodiments, the invention relates to any one of the above-mentioned fluid treatment devices, wherein the inner core is a cylinder; the layer immediately adjacent to the inner core is a first layer of interleaf; the first opening is operably connected to the first layer of interleaf; and the first opening is an inlet.

In certain embodiments, the invention relates to any one of the above-mentioned fluid treatment devices, wherein the inner core is a cylinder; the layer immediately adjacent to the inner core is a first layer of interleaf; the second opening is operably connected to the first layer of interleaf; and the second opening is an outlet.

In certain embodiments, the invention relates to any one of the above-mentioned fluid treatment devices, wherein the inner core is operably connected to the first opening; and the first opening is an inlet.

In certain embodiments, the invention relates to any one of the above-mentioned fluid treatment devices, wherein the inner core is operably connected to the second opening; and the second opening is an outlet.

In certain embodiments, the invention relates to any one of the above-mentioned fluid treatment devices, wherein the fluid flow path is towards the inner core.

In certain embodiments, the invention relates to any one of the above-mentioned fluid treatment devices, wherein the fluid flow path is away from the inner core.

In certain embodiments, the invention relates to any one of the above-mentioned fluid treatment devices, wherein the housing unit is substantially cylindrical. In certain embodiments, the housing unit has an inner diameter of about 1 cm to about 50 cm.

In certain embodiments, the invention relates to any one of the above-mentioned fluid treatment devices, wherein the inner diameter of the housing unit is greater than the external diameter of the wrapped fluid treatment element.

In certain embodiments, the thickness of the walls of the housing unit may be adapted to the specific operation conditions.

In certain embodiments, the invention relates to any one of the above-mentioned fluid treatment devices, wherein the housing unit is disposable or reusable.

In certain embodiments, the invention relates to any one of the above-mentioned fluid treatment devices, wherein the housing unit is plastic or stainless steel.

In certain embodiments, the invention relates to any one of the above-mentioned fluid treatment devices, wherein a plurality of housing units are arranged in series.

In certain embodiments, the invention relates to any one of the above-mentioned fluid treatment devices, comprising about 2 to about 10 housing units.

In certain embodiments, wherein the first opening or the second opening is a press fit attachment point, a luer lock attachment point, or a hose barb attachment point. In certain embodiments, the first opening is a press fit, luer lock, or hose barb attachment points. In certain embodiments, the second opening is a press fit, luer lock, or hose barb attachment points. In certain embodiments, the first opening or the second opening are different kinds of attachment points from one another. In certain embodiments, the first opening or the second opening are both press fit attachment points. In certain embodiments, the first opening or the second opening are both luer lock attachment points. In certain embodiments, the first opening or the second opening are both hose barb attachment points.

In certain embodiments, the invention relates to any one of the above-mentioned fluid treatment devices, wherein the device can be scaled by increasing either the diameter or length of the housing unit.

In certain embodiments, the invention relates to any one of the above-mentioned fluid treatment devices, wherein the device comprises a sensor. In certain embodiments, the sensor is a radio-frequency (RF) sensor. In certain embodiments, the device and the sensor are configured as described in US 2011/10031178 (hereby incorporated by reference in its entirety). In certain embodiments, the device and sensor are configured as described in US 2011/10094951 (hereby incorporated by reference in its entirety). In certain embodiments, the sensor provides information regarding temperature, pressure, pH, or conductivity of the device. In certain embodiments, the sensor provides information regarding temperature, pressure, pH, or conductivity of an internal microenvironment of the device. In certain embodiments, the communication system for the sensor can be of any type, such as a wireless RF transmitter, an infrared (IR) transmitter, an inductance coil, or a sound generator. In certain embodiments, the sensor wirelessly reports data without the need for maintaining or replacing batteries. Instead, the sensing systems rely on harvesting vibration, strain energy, or magnetic coupled energy from the local environment for conversion to electrical power for storage and use to collect, store, or transmit data by the sensing system. In certain embodiments, the sensor is powered remotely by a system as described in U.S. Pat. No. 7,901,570 (hereby incorporated by reference in its entirety).

Exemplary Wrapped Fluid Treatment Elements

In certain embodiments, the invention relates to wrapped fluid treatment elements. In certain embodiments, the wrapped fluid treatment element is for use in a fluid treatment device of the present invention.

In certain embodiments, the invention relates to a wrapped fluid treatment element comprising:
a composite material;
an interleaf; and
an inner core,
wherein the composite material and the interleaf form layers wrapped around the inner core.

In certain embodiments, the invention relates to any one of the above-mentioned wrapped fluid treatment elements, wherein the layers of composite material and interleaf are alternating layers of composite material and interleaf (that is, (composite material-interleaf)$_x$ or (interleaf-composite material)$_x$). In certain embodiments, the invention relates to any one of the above-mentioned wrapped fluid treatment elements, wherein the layers of composite material and interleaf are arranged (interleaf-first composite material-second composite material)$_x$ or (first composite material-second composite material-interleaf)$_x$ In certain embodiments, the invention relates to any one of the above-mentioned wrapped fluid treatment elements, wherein the layers of composite material and interleaf are arranged in a combination of the aforementioned arrangements. In certain embodiments, the first composite material and the second composite material are identical.

In certain embodiments, the invention relates to any one of the above-mentioned wrapped fluid treatment elements, wherein the layers are wrapped spirally around the inner core. In certain embodiments, the composite material is in contact with the interleaf. In certain embodiments, a first surface of the composite material is not in contact with a second surface of the composite material. In certain embodiments, the interleaf prevents the first surface of the composite material from being in contact with the second surface of the composite material.

In certain embodiments, the invention relates to any one of the above-mentioned wrapped fluid treatment elements, wherein the layers are concentric circles around the inner core. In certain embodiments, the invention relates to any one of the above-mentioned wrapped fluid treatment elements, wherein the layers are not concentric circles around the inner core.

In certain embodiments, the invention relates to any one of the above-mentioned wrapped fluid treatment elements, wherein the layer immediately adjacent to the inner core is a layer of interleaf.

In certain embodiments, the invention relates to any one of the above-mentioned wrapped fluid treatment elements, wherein the inner core is a cylinder; and the layer immediately adjacent to the inner core is a layer of interleaf.

In certain embodiments, the invention relates to any one of the above-mentioned wrapped fluid treatment elements, wherein the wrapped fluid treatment element comprises about 3 to about 50 layers of composite material around the inner core. In certain embodiments, the invention relates to any one of the above-mentioned wrapped fluid treatment elements, wherein the wrapped fluid treatment element comprises about 5 to about 35 layers of composite material around the inner core.

In certain embodiments, the invention relates to wrapped fluid treatment elements comprising membranes. In certain embodiments, the invention relates to wrapped fluid treatment elements comprising composite materials for use as membranes.

In certain embodiments, the wrapped fluid treatment elements are disposable or reusable.

In certain embodiments, the wrapped fluid treatment elements of the present invention accommodate high solid density materials. In certain embodiments, the wrapped fluid treatment elements of the present invention are used for their strength. In certain embodiments, the wrapped fluid treatment elements of the present invention are used in heavy duty applications. In certain embodiments, the wrapped fluid treatment elements of the present invention can tolerate elevated temperatures for sustained periods.

In certain embodiments, the wrapped fluid treatment elements of the present invention exhibit reduced capture time in chromatography applications. In certain embodiments, the wrapped fluid treatment elements of the present invention exhibit high binding capacities.

In certain embodiments, the packing density of the composite material may be improved by increasing the number of wraps in a wrapped fluid treatment element.

In certain embodiments, the wrapped fluid treatment elements of the invention relate to an integral membrane element. In certain embodiments, the components of the wrapped fluid treatment element are sealed while wrapping the composite material and interleaf. In certain embodiments, the components of the wrapped fluid treatment element are sealed in a post-wrapped state. In certain embodiments, the invention may related to any one of the above-mentioned wrapped fluid treatment elements, wherein the wrapped fluid treatment element further comprises a sealing end cap, wherein the sealing end cap seals the layers of wrapped composite material and interleaf. In certain embodiments, the end may be sealed by wicking a lower viscosity adhesive into the element and curing it such that a seal is formed.

In certain embodiments, the invention relates to a wrapped fluid treatment element configured as a spiral wound device. In certain embodiments, this fluid treatment element, for example, comprises two rectangular sheets of membrane (composite material), separated by one rectangular sheet of permeate spacer of a similar size as the two sheets of membrane. The membrane envelope is sealed on three sides (two long sides and one short side). The unsealed short side of the envelope is attached to the inner core, and the sealed envelope is wrapped around the inner core. By this method, permeate must only pass through one membrane layer before it travels in a spiral fashion along the permeate spacer layer to the inner core.

Exemplary Interleaf

In certain embodiments, the presence of interleaf material between the membrane layers improves the performance of the device. In certain embodiments, the interleaf helps to reduce back-pressure. In certain embodiments, the interleaf helps to maintain binding capacity.

In certain embodiments, interleaf may be a screen or a non-woven material.

In certain embodiments, the interleaf is mesh. In certain embodiments, the interleaf is 1-mm mesh or 0.45-mm mesh.

In certain embodiments, the interleaf is a capsule spacer. In certain embodiments, a capsule spacer is made of the same material as the material used as a spacer in a pleated capsule device. In certain embodiments, the capsule spacer is UNIPRO FX (100% SB polypropylene (flat bond)) from Midwest Filtration. In certain embodiments, the interleaf is about 100 µm to about 400 µm thick. In certain embodiments, the interleaf is about 100 µm, about 150 µm, about 200 µm, about 250 µm, about 300 µm, about 350 µm, or about 400 µm thick. In certain embodiments, the interleaf is about 210 µm thick. In certain embodiments, the interleaf has about 50% to about 99% volume porosity. In certain embodiments, the interleaf has about 70% to about 95% volume porosity. In certain embodiments, the interleaf has about 70%, about 75%, about 80%, about 85%, about 90%, or about 95% volume porosity. In certain embodiments, the interleaf has from about 80% to about 90% volume porosity. In certain embodiments, the interleaf is substantially compressible.

In certain embodiments, the interleaf is a lab substrate. In certain embodiments, the interleaf is polypropylene. In certain embodiments, the interleaf is non-woven polypropylene. In certain embodiments, the interleaf is non-woven polypropylene from Hollingsworth and Vose. In certain embodiments, the interleaf is about 100 µm to about 400 µm thick. In certain embodiments, the interleaf is about 100 µm, about 150 µm, about 200 µm, about 250 µm, about 300 µm, about 350 µm, or about 400 µm thick. In certain embodiments, the interleaf is about 250 µm thick. In certain embodiments, the interleaf has about 50% to about 90% volume porosity. In certain embodiments, the interleaf has about 60% to about 85% volume porosity. In certain embodiments, the interleaf has about 65%, about 70%, about 75%, about 80%, or about 85% volume porosity. In certain embodiments, the interleaf has from about 70% to about 80% volume porosity. In certain embodiments, the interleaf is substantially compressible.

In certain embodiments, the interleaf is polyethylene. In certain embodiments, the interleaf is high-density polyethylene.

In certain embodiments, the interleaf is a lab-like substrate. In certain embodiments, the interleaf is polypropylene. In certain embodiments, the interleaf is spunbound polypropylene. In certain embodiments, the interleaf is spunbound polypropylene of basis weight of about 0.70 oz/yd$^2$ to about 0.95 oz/yd$^2$. In certain embodiments, the interleaf is spunbound polypropylene of basis weight of about 0.70 oz/yd$^2$, about 0.75 oz/yd$^2$, about 0.80 oz/yd$^2$, about 0.85 oz/yd$^2$, about 0.90 oz/yd$^2$, or about 0.95 oz/yd$^2$. In certain embodiments, the interleaf is spunbound polypropylene of basis weight about 0.86 oz/yd$^2$. In certain embodiments, the interleaf is about 50 µm to about 300 µm thick. In certain embodiments, the interleaf is about 50 µm, about 100 µm, about 150 µm, about 200 µm, about 250 µm, or about 300 µm thick. In certain embodiments, the interleaf is about 150 µm thick. In certain embodiments, the interleaf has about 50% to about 99% volume porosity. In certain embodiments, the interleaf has about 80% to about 99% volume porosity. In certain embodiments, the interleaf has about 80%, about 85%, about 90%, or about 95% volume porosity. In certain embodiments, the interleaf has from about 85% to about 99% volume porosity. In certain embodiments, the interleaf is substantially compressible.

In certain embodiments, the interleaf is a filter. In certain embodiments, the interleaf is polypropylene. In certain embodiments, the interleaf is AVSPUN 70 GSM POLYPRO, from Midwest Filtration. In certain embodiments, the interleaf is about 100 µm to about 500 µm thick. In certain embodiments, the interleaf is about 100 µm, about 150 µm, about 200 µm, about 250 µm, about 300 µm, about 350 µm, about 400 µm, about 450 µm, or about 500 µm thick. In certain embodiments, the interleaf is about 365 µm thick. In certain embodiments, the interleaf has about 50% to about 90% volume porosity. In certain embodiments, the interleaf has about 65% to about 90% volume porosity. In certain embodiments, the interleaf has about 65%, about 70%, about 75%, about 80%, about 85%, about 90%, or about 95% volume porosity. In certain embodiments, the interleaf has from about 75% to about 85% volume porosity. In certain embodiments, the interleaf is substantially compressible.

In certain embodiments, the interleaf is mesh. In certain embodiments, the mesh interleaf is extruded netting. In certain embodiments, the mesh interleaf is about 0.45-mm mesh. In certain embodiments, the mesh interleaf is a biplanar thermoplastic netting. In certain embodiments, the mesh interleaf is substantially similar to Naltex (a particular biplanar thermoplastic netting), from DelStar Technologies, Inc. In certain embodiments, the interleaf is about 300 µm to about 600 µm thick. In certain embodiments, the interleaf is about 300 µm, about 350 µm, about 400 µm, about 450 µm, about 500 µm, about 550 µm, or about 600 µm thick. In certain embodiments, the interleaf is about 450 µm thick. In certain embodiments, the interleaf has about 90% to about 99% volume porosity. In certain embodiments, the interleaf has about 90%, about 91%, about 92%, about 93%, about 94%, about 95%, about 96%, about 97%, about 98%, or about 99% volume porosity. In certain embodiments, the interleaf has from about 97% to about 99% volume porosity. In certain embodiments, the interleaf is substantially non-compressible.

In certain embodiments, the interleaf is mesh. In certain embodiments, the mesh interleaf is extruded netting. In certain embodiments, the mesh interleaf is about 0.45-mm mesh. In certain embodiments, the mesh interleaf is a biplanar thermoplastic netting. In certain embodiments, the mesh interleaf is substantially similar to Naltex, from DelStar Technologies, Inc. In certain embodiments, the interleaf is about 800 µm to about 1200 µm thick. In certain embodiments, the interleaf is about 800 µm, about 850 µm, about 900 µm, about 950 µm, about 1000 µm, about 1050 µm, about 1100 µm, about 1150 µm, or about 1200 µm thick. In certain embodiments, the interleaf is about 1000 µm thick. In certain embodiments, the interleaf has about 90% to about 99% volume porosity. In certain embodiments, the interleaf has about 90%, about 91%, about 92%, about 93%, about 94%, about 95%, about 96%, about 97%, about 98%, or about 99% volume porosity. In certain embodiments, the interleaf has from about 97% to about 99% volume porosity. In certain embodiments, the interleaf is substantially non-compressible.

In certain embodiments, the interleaf is paper. In certain embodiments, the interleaf is unbound glass. In certain embodiments, the interleaf is cellulose. In certain embodiments, the interleaf is about 20 µm to about 400 µm thick. In certain embodiments, the interleaf is about 20 µm, about 40 µm, about 60 µm, about 80 µm, about 100 µm, about 150 µm, about 200 µm, about 250 µm, about 300 µm, about 350 µm, or about 400 µm thick. In certain embodiments, the interleaf has about 40% to about 90% volume porosity. In certain embodiments, the interleaf has about 45% to about 85% volume porosity. In certain embodiments, the interleaf has about 45%, about 50%, about 55%, about 60%, about 65%, about 70%, about 75%, about 80%, or about 85% volume porosity. In certain embodiments, the interleaf has from about 50% to about 80% volume porosity. In certain embodiments, the interleaf is substantially compressible.

In certain embodiments, the thickness of interleaf may be increased by merely increasing the number of interleaf layers.

In certain embodiments, interleaf properties such as compressibility, percentage of openness, etc. have significant effect on the performance of the fluid treatment device.

Exemplary Inner Core

In certain embodiments, the invention relates to any one of the above-mentioned wrapped fluid treatment elements, wherein the composite material and the interleaf is wrapped around an inner core.

In certain embodiments, the inner core provides support to the wrapped fluid treatment element. In certain embodiments, the inner core provides a flow channel for a fluid.

In certain embodiments, the inner core is a cylinder. In certain embodiments, the inner core is a cylindrical pipe. In certain embodiments, the inner core is a solid cylinder.

In certain embodiments, the inner core is a cylindrical pipe. In certain embodiments, the inner core is a cylinder; and the cylinder comprises grooves or channels on its surface.

In certain embodiments, the inner core is a cylindrical pipe. In certain embodiments, the inner core is a cylinder; and the cylinder is machined.

In certain embodiments, the inner core is a cylindrical pipe. In certain embodiments, the inner core is a cylinder that is capped or sealed at both of its ends.

In certain embodiments, the inner core is a cylindrical pipe. In certain embodiments, the inner core is a perforated cylindrical pipe. In certain embodiments, the inner core is a perforated cylindrical pipe that is capped or sealed at one of its ends.

In certain embodiments, the inner core is plastic. In certain embodiments, the inner core is polypropylene.

In certain embodiments, the inner core is plastic. In certain embodiments, the inner core is polysulfone.

In certain embodiments, the material comprising the inner core may be inherently porous. In certain embodiments, the inner core is POREX.

In certain embodiments, the material comprising the inner core is not inherently porous, but holes may be mechanically made in the non-porous inner core. In certain embodiments, holes are made in the inner core by drilling. In certain embodiments, a flow channel may be made by machining.

In certain embodiments, the inner core is a screen wrapped around a pipe. In certain embodiments, the screen provides a method by which fluid may flow.

In certain embodiments, the diameter of the inner core is about 0.2 cm to about 200 cm. In certain embodiments, the diameter of the inner core is about 0.2 cm, about 0.4 cm, about 0.5 cm, about 0.6 cm, about 0.8 cm, about 1 cm, about 2 cm, about 3 cm, about 4 cm, about 5 cm, about 10 cm, about 20 cm, about 30 cm, about 40 cm, about 50 cm, about 75 cm, about 100 cm, about 125 cm, about 150 cm, or about 175 cm.

In certain embodiments, the length of the inner core is about 2 cm to about 200 cm. In certain embodiments, the length of the inner core is about 2 cm, about 3 cm, about 4 cm, about 5 cm, about 10 cm, about 20 cm, about 30 cm, about 40 cm, about 50 cm, about 75 cm, about 100 cm, about 125 cm, about 150 cm, or about 175 cm.

In certain embodiments, the inner core is a perforated cylindrical pipe, wherein the perforations are slots or holes.

In certain embodiments, the inner core comprises a highly porous cell structure like material. In certain embodiments, the inner core comprises interleaf wrapped upon itself.

In certain embodiments, the inner core is wrapped with a screen.

In certain embodiments, the inner core is a perforated rectangular prism, a perforated triangular prism, or a perforated square prism. In certain embodiments, the inner core is a perforated rectangular prism, a perforated triangular prism, or a perforated square prism, wherein the perforated rectangular prism, the perforated triangular prism, or the perforated square prism is capped or sealed at one end.

Exemplary Composite Materials

In certain embodiments, the invention relates to any one of the above-mentioned fluid treatment devices or wrapped fluid treatment elements comprising a composite material. In certain embodiments, the invention comprises a composite material for use as a membrane.

In certain embodiments, the composite materials used as membranes in the present invention are described in U.S. Pat. No. 7,316,919; and U.S. patent application Ser. Nos. 11/950,562, 12/108,178, 12/244,940, 12/250,861, 12/211,618, and 12/250,869; all of which are hereby incorporated by reference.

In certain embodiments, the invention relates to any one of the above-mentioned fluid treatment devices or wrapped fluid treatment elements, wherein the composite material comprises
 a support member comprising a plurality of pores extending through the support member; and
 a non-self-supporting macroporous cross-linked gel comprising macropores having an average diameter of 10 nm to 3000 nm, said macroporous gel being located in the pores of the support member;
 wherein said macropores of said macroporous cross-linked gel are smaller than said pores of said support member.

In certain embodiments, the invention relates to any one of the above-mentioned fluid treatment devices or wrapped fluid treatment elements, wherein the macroporous cross-linked gel of the composite material has macropores of average diameter between about 25 nm and about 1500 nm. In certain embodiments, the macroporous crosslinked gel has macropores of average diameter between about 50 nm and about 1000 nm. In certain embodiments, the macroporous crosslinked gel has macropores of average diameter of about 700 nm. In certain embodiments, the macroporous crosslinked gel has macropores of average diameter of about 300 nm.

In certain embodiments, the invention relates to any one of the above-mentioned fluid treatment devices or wrapped fluid treatment elements, wherein the macroporous cross-linked gel of the composite material is a hydrogel, a polyelectrolyte gel, a hydrophobic gel, a neutral gel, or a gel comprising functional groups. In certain embodiments, the invention relates to any one of the above-mentioned fluid treatment devices or wrapped fluid treatment elements, wherein the macroporous cross-linked gel of the composite material is a neutral or charged hydrogel; and the neutral or charged hydrogel is selected from the group consisting of cross-linked poly(vinyl alcohol), poly(acrylamide), poly (isopropylacrylamide), poly(vinylpyrrolidone), poly(hydroxymethyl acrylate), poly(ethylene oxide), copolymers of acrylic acid or methacrylic acid with acrylamide, isopropylacrylamide, or vinylpyrrolidone, copolymers of acrylamide-2-methyl-1-propanesulfonic acid with acrylamide, isopropylacrylamide, or vinylpyrrolidone, copolymers of (3-acrylamido-propyl) trimethylammonium chloride with acrylamide, isopropylacrylamide, or N-vinyl-pyrrolidone, and copolymers of diallyldimethylammonium chloride with acrylamide, isopropylacrylamide, or vinylpyrrolidone. In certain embodiments, the invention relates to any one of the above-mentioned fluid treatment devices or wrapped fluid treatment elements, wherein the macroporous cross-linked gel of the composite material is a polyelectrolyte gel; and the polyelectrolyte gel is selected from the group consisting of cross-linked poly(acrylamido-2-methyl-1-propanesulfonic acid) and its salts, poly(acrylic acid) and its salts, poly (methacrylic acid) and its salts, poly(styrenesulfonic acid) and its salts, poly(vinylsulfonic acid) and its salts, poly (alginic acid) and its salts, poly[(3-acrylamidopropyl)trimethylammonium] salts, poly(diallyldimethylammonium) salts, poly(4-vinyl-N-methylpyridinium) salts, poly(vinylbenzyl-N-trimethylammonium) salts, and poly(ethyleneimine) and its salts. In certain embodiments, the invention relates to any one of the above-mentioned fluid treatment devices or wrapped fluid treatment elements, wherein the macroporous cross-linked gel of the composite material is a hydrophobic gel; and the hydrophobic gel is selected from the group consisting of cross-linked polymers or copolymers of ethyl acrylate, n-butyl acrylate, propyl acrylate, octyl acrylate, dodecyl acrylate, octadecylacrylamide, stearyl acrylate, and styrene. In certain embodiments, the invention relates to any one of the above-mentioned fluid treatment devices or wrapped fluid treatment elements, wherein the macroporous cross-linked gel of the composite material is a neutral gel; and the neutral gel is selected from the group consisting of cross-linked polymers or copolymers of acrylamide, N,N-dimethylacrylamide, N-methacryloylacrylamide, N-methyl-N-vinylacetamide, and N-vinylpyrrolidone.

In certain embodiments, the invention relates to any one of the above-mentioned fluid treatment devices or wrapped fluid treatment elements, wherein the macroporous cross-linked gel of the composite material is a gel comprising functional groups. In certain embodiments, the macroporous cross-linked gel of the composite material comprises monomers, wherein the monomers comprise functional groups. In certain embodiments, the functional groups are thiols or protected thiols. In certain embodiments, the macroporous cross-linked gel comprises monomers, wherein the monomers are selected from the group consisting of allyl 3-mercaptopropionate thioacetate, (S-benzoyl-3-mercapto-2-hydroxypropyl)-2-methyl-2-propenoate, (S-2,2-dimethylpropanoyl-3-mercapto-2-hydroxypropyl)-2-methyl-2-propenoate, (S-acetyl-3-mercapto-2-acetylpropyl)-2-methyl-2-propenoate, (S-acetyl-3-mercapto-2-hydroxypropyl)-2-methyl-2-propenoate, (S-acetyl-3-mercapto-2-acetoacetylpropyl)-2-methyl-2-propenoate, (S-acetyl-3-mercapto-2-tetrahydropyranyl)-2-methyl-2-propenoate, (S-acetyl-3-mercapto-2-(2-methoxy-2-propoxy))-2-methyl-2-propenoate, (S-acetyl-2-mercapto-3-acetylpropyl)-2-methyl-2-propenoate, S-acetyl-(1-allyloxy-3-mercapto-2-hydroxypropane), S-benzoyl-(1-allyloxy-3-mercapto-2-hydroxypropane) and S-2,2-dimethylpropanoyl-(1-allyloxy-3-mercapto-2-hydroxypropane).

In certain embodiments, the invention relates to any one of the above-mentioned fluid treatment devices or wrapped fluid treatment elements, wherein the composite material comprises functional groups; and the functional groups are selected from the group consisting of amino acid ligands, antigen and antibody ligands, dye ligands, biological molecules, biological ions, and metal affinity ligands.

In certain embodiments, the invention relates to any one of the above-mentioned fluid treatment devices or wrapped fluid treatment elements, wherein the composite material comprises functional groups; and said functional groups are metal affinity ligands. In certain embodiments, the invention relates to any one of the above-mentioned fluid treatment devices or wrapped fluid treatment elements, wherein the composite material comprises functional groups; said functional groups are metal affinity ligands; and a plurality of metal ions are complexed to a plurality of said metal affinity ligands.

In certain embodiments, the invention relates to any one of the above-mentioned fluid treatment devices or wrapped fluid treatment elements, wherein the composite material comprises metal affinity ligands; and said metal affinity ligands are polydentate ligands.

In certain embodiments, the invention relates to any one of the above-mentioned fluid treatment devices or wrapped fluid treatment elements, wherein the composite material comprises metal affinity ligands; and said metal affinity ligands are octadentate, hexadentate, tetradentate, tridentate or bidentate ligands.

In certain embodiments, the invention relates to any one of the above-mentioned fluid treatment devices or wrapped fluid treatment elements, wherein the composite material comprises metal affinity ligands; and said metal affinity ligands are tetradentate ligands.

In certain embodiments, the invention relates to any one of the above-mentioned fluid treatment devices or wrapped fluid treatment elements, wherein the composite material comprises metal affinity ligands; and said metal affinity ligands are tridentate ligands.

In certain embodiments, the invention relates to any one of the above-mentioned fluid treatment devices or wrapped fluid treatment elements, wherein the composite material comprises metal affinity ligands; and said metal affinity ligands are bidentate ligands.

In certain embodiments, the invention relates to any one of the above-mentioned fluid treatment devices or wrapped fluid treatment elements, wherein the composite material comprises metal affinity ligands; and said metal affinity ligands are iminodicarboxylic acid ligands.

In certain embodiments, the invention relates to any one of the above-mentioned fluid treatment devices or wrapped fluid treatment elements, wherein the composite material comprises metal affinity ligands; and said metal affinity ligands are iminodiacetic acid ligands.

In certain embodiments, the invention relates to any one of the above-mentioned fluid treatment devices or wrapped fluid treatment elements, wherein the composite material comprises metal affinity ligands; and said metal affinity ligands are salts of iminodiacetic acid ligands.

In certain embodiments, the invention relates to any one of the above-mentioned fluid treatment devices or wrapped fluid treatment elements, wherein the composite material comprises metal affinity ligands; and said metal affinity ligands are sodium salts of iminodiacetic acid ligands.

In certain embodiments, the invention relates to any one of the above-mentioned fluid treatment devices or wrapped fluid treatment elements, wherein the composite material comprises metal affinity ligands; and said metal affinity ligands are potassium salts of iminodiacetic acid ligands.

In certain embodiments, the invention relates to any one of the above-mentioned fluid treatment devices or wrapped fluid treatment elements, wherein the composite material comprises metal affinity ligands; and said metal affinity ligands comprise ethylenediamine moieties.

In certain embodiments, the invention relates to any one of the above-mentioned fluid treatment devices or wrapped fluid treatment elements, wherein the composite material comprises metal affinity ligands; and said metal affinity ligands comprise hexamethylenediamine moieties.

In certain embodiments, the invention relates to any one of the above-mentioned fluid treatment devices or wrapped fluid treatment elements, wherein the composite material comprises metal affinity ligands; and said metal affinity ligands comprise diethanolamine moieties.

In certain embodiments, the invention relates to any one of the above-mentioned fluid treatment devices or wrapped fluid treatment elements, wherein the composite material comprises metal affinity ligands; and said metal affinity ligands comprise pentaethylenehexamine moieties.

In certain embodiments, the invention relates to any one of the above-mentioned fluid treatment devices or wrapped fluid treatment elements, wherein the composite material comprises metal affinity ligands; and said metal affinity ligands comprise triethylenetetramine moieties.

In certain embodiments, the invention relates to any one of the above-mentioned fluid treatment devices or wrapped fluid treatment elements, wherein the composite material comprises metal affinity ligands; and said metal affinity ligands comprise tris(carboxymethyl)ethylene diamine.

In certain embodiments, the invention relates to any one of the above-mentioned fluid treatment devices or wrapped fluid treatment elements, wherein the composite material comprises metal affinity ligands; and said metal affinity ligands comprise conjugate bases of carboxylic acids. In certain embodiments, the conjugate bases are available as salts. In certain embodiments, the conjugate bases are available as sodium salts or potassium salts. In certain embodiments, the conjugate bases are available as sodium salts. In certain embodiments, the conjugate bases are available as potassium salts.

In certain embodiments, the invention relates to any one of the above-mentioned fluid treatment devices or wrapped fluid treatment elements, wherein the composite material comprises metal affinity ligands complexed to a plurality of metal ions; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; and said metal ions are zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are octadentate, hexadentate, tetradentate, tridentate or bidentate ligands; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are octadentate, hexadentate, tetradentate, tridentate or bidentate ligands; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are octadentate, hexadentate, tetradentate, tridentate or bidentate ligands; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are octadentate, hexadentate, tetradentate, tridentate or bidentate ligands; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are octadentate, hexadentate, tetradentate, tridentate or bidentate ligands; and said metal ions are zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tetradentate ligands; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tetradentate ligands; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tetradentate ligands; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tetradentate ligands; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tetradentate ligands; and said metal ions are zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tridentate ligands; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tridentate ligands; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tridentate ligands; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tridentate ligands; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are tridentate ligands; and said metal ions are zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are bidentate ligands; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are bidentate ligands; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are bidentate ligands; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are bidentate ligands; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are bidentate ligands; and said metal ions are zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodicarboxylic acid ligands; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodicarboxylic acid ligands; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodicarboxylic acid ligands; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodicarboxylic acid ligands; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodicarboxylic acid ligands; and said metal ions are zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodiacetic acid ligands; and said metal ions are transition metal ions, lanthanide ions, poor metal ions or alkaline earth metal ions.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodiacetic acid ligands; and said metal ions are selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodiacetic acid ligands; and said metal ions are nickel or zirconium.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodiacetic acid ligands; and said metal ions are nickel.

In certain embodiments, the invention relates to any one of the above-mentioned fluid treatment devices or wrapped fluid treatment elements, wherein the composite material comprises metal affinity ligands complexed to a plurality of metal ions; said metal affinity ligands are iminodiacetic acid ligands; and said metal ions are zirconium.

In certain embodiments, the invention relates to any one of the above-mentioned fluid treatment devices or wrapped fluid treatment elements, wherein the composite material comprises functional groups; and the functional groups are biological molecules or biological ions. In certain embodiments, the biological molecules or biological ions are selected from the group consisting of albumins, lysozyme, viruses, cells, γ-globulins of human and animal origins, immunoglobulins of both human and animal origins, proteins of recombinant or natural origin including, polypeptides of synthetic or natural origin, interleukin-2 and its receptor, enzymes, monoclonal antibodies, antigens, lectins, bacterial immunoglobulin-binding proteins, trypsin and its inhibitor, cytochrome C, myoglobulin, recombinant human interleukin, recombinant fusion protein, Protein A, Protein G, Protein L, Peptide H, nucleic acid derived products, DNA of either synthetic or natural origin, and RNA of either synthetic or natural origin.

In certain embodiments, the invention relates to any one of the above-mentioned fluid treatment devices or wrapped fluid treatment elements, wherein the composite material comprises Protein A. Protein A is a 40-60 kDa MSCRAMM surface protein originally found in the cell wall of the bacteria *Staphylococcus aureus*. It is encoded by the spa gene and its regulation is controlled by DNA topology, cellular osmolarity, and a two-component system called ArlS-ArlR. It has found use in biochemical research because of its ability to bind immunoglobulins. It binds proteins from many of mammalian species, most notably IgGs. It binds with the Fc region of immunoglobulins through interaction with the heavy chain. The result of this type of interaction is that, in serum, the bacteria will bind IgG molecules in the wrong orientation (in relation to normal antibody function) on their surface which disrupts opsonization and phagocytosis. It binds with high affinity to human IgG1 and IgG2 as well as mouse IgG2a and IgG2b. Protein A binds with moderate affinity to human IgM, IgA and IgE as well as to mouse IgG3 and IgG1. It does not react with human IgG3 or IgD, nor will it react to mouse IgM, IgA or IgE.

In certain embodiments, the invention relates to any one of the above-mentioned fluid treatment devices or wrapped fluid treatment elements, wherein the macroporous cross-linked gel of the composite material comprises a macromonomer. In certain embodiments, the macromonomer is selected from the group consisting of poly(ethylene glycol) acrylate and poly(ethylene glycol) methacrylate.

In certain embodiments, the invention relates to any one of the above-mentioned fluid treatment devices or wrapped fluid treatment elements, wherein the macroporous cross-linked gel of the composite material is cross-linked by N,N-methylenebisacrylamide or a polyfunctional macromonomer. In certain embodiments, the macroporous cross-linked gel of the composite material is cross-linked by a polyfunctional macromonomer; and the polyfunctional macromonomer is selected from the group consisting of poly(ethylene glycol) diacrylate and poly(ethylene glycol) dimethacrylate. In certain embodiments, the invention relates to any one of the above-mentioned fluid treatment devices or elements, wherein the macroporous cross-linked gel of the composite material is cross-linked by N,N-methylenebisacrylamide.

In certain embodiments, the invention relates to any one of the above-mentioned fluid treatment devices or wrapped fluid treatment elements, wherein the macroporous cross-linked gel of the composite material is a positively charged hydrogel comprising a co-polymer of (3-acrylamidopropyl) trimethylammonium chloride (APTAC) and N-(hydroxyethyl)acrylamide cross-linked by N,N'-methylenebisacrylamide.

In certain embodiments, the invention relates to any one of the above-mentioned fluid treatment devices or wrapped fluid treatment elements, wherein the composite material is a membrane; and the macroporous cross-linked gel bears charged moieties.

In certain embodiments, the invention relates to any one of the above-mentioned fluid treatment devices or wrapped fluid treatment elements, wherein the composite material is a membrane for use as a filter in size exclusion separation.

In certain embodiments, the fluid treatment devices or wrapped fluid treatment elements of the invention comprise any one of the above-mentioned composite materials, wherein the composite materials comprise negatively-charged moieties. Negatively-charged membranes repel foulants at the membrane surface resulting in higher flux, easier cleanings, and lower system costs.

In certain embodiments, the fluid treatment devices or wrapped fluid treatment elements of the invention comprise any one of the above-mentioned composite materials, wherein the composite materials are hydrophilic in nature. Foulants are typically hydrophobic species.

In certain embodiments, the invention relates to any one of the above-mentioned fluid treatment devices or wrapped fluid treatment elements, wherein the support member of the composite material consists essentially of polymeric material in the form of a membrane that has a thickness of about 10 μm to about 500 μm and comprises pores of average diameter of about 0.1 to about 25 μm.

In certain embodiments, the invention relates to any one of the above-mentioned fluid treatment devices or wrapped fluid treatment elements, wherein the support member of the composite material consists essentially of a polyolefin.

In certain embodiments, the invention relates to any one of the above-mentioned fluid treatment devices or wrapped fluid treatment elements, wherein the support member of the composite material comprises a polymeric material selected from the group consisting of polysulfones, polyethersulfones, polyphenyleneoxides, polycarbonates, polyesters, cellulose and cellulose derivatives.

In certain embodiments, the invention relates to any one of the above-mentioned fluid treatment devices or wrapped fluid treatment elements, wherein the support member of the composite material consists essentially of polymeric material in the form of a fibrous fabric that has a thickness of about 10 μm to about 2000 μm and comprises pores of average diameter of about 0.1 to about 25 μm.

In certain embodiments, the invention relates to any one of the above-mentioned fluid treatment devices or wrapped fluid treatment elements, wherein the support member of the composite material comprises a stack of 2 to 10 separate support members.

Exemplary Methods

In certain embodiments, the invention relates to a method comprising the step of:
contacting a first fluid comprising a substance with a composite material in any one of the above-mentioned wrapped fluid treatment elements, thereby adsorbing or absorbing the substance onto the composite material.

In certain embodiments, the invention relates to any one of the above-mentioned methods, further comprising the step of
placing the first fluid in a first opening of a fluid treatment device.

In certain embodiments, the invention relates to any one of the above-mentioned methods, further comprising the step of
contacting a second fluid with the substance adsorbed or absorbed onto the composite material, thereby releasing the substance from the composite material.

In certain embodiments, the invention relates to any one of the above-mentioned methods, wherein the substance is separated based on size exclusion.

In certain embodiments, the invention relates to any one of the above-mentioned methods, wherein the macroporous gel displays a specific interaction for the substance.

In certain embodiments, the invention relates to any one of the above-mentioned methods, wherein the specific interactions are electrostatic interactions, affinity interactions, or hydrophobic interactions.

In certain embodiments, the invention relates to any one of the above-mentioned methods, wherein the specific interactions are electrostatic interactions, the composite material bears charges on the macroporous gel; the substance is charged; and the substance is separated based on Donnan exclusion.

In certain embodiments, the invention relates to any one of the above-mentioned methods, wherein the first fluid is a suspension of cells or a suspension of aggregates.

In certain embodiments, the invention relates to any one of the above-mentioned methods, wherein the substance is a biological molecule or biological ion.

In certain embodiments, the invention relates to any one of the above-mentioned methods, wherein the biological molecule or biological ion is selected from the group consisting of albumins, lysozyme, viruses, cells, γ-globulins of human and animal origins, immunoglobulins of both human and animal origins, proteins of recombinant or natural origin including, polypeptides of synthetic or natural origin, interleukin-2 and its receptor, enzymes, monoclonal antibodies, trypsin and its inhibitor, cytochrome C, myoglobulin, recombinant human interleukin, recombinant fusion protein, nucleic acid derived products, DNA of either synthetic or natural origin, and RNA of either synthetic or natural origin.

In certain embodiments, the invention relates to any one of the above-mentioned methods, wherein the biological molecule or biological ion is a protein; and the protein comprises exposed amino acid residues selected from the group consisting of Glu, Asp, Try, Arg, Lys, Met, and His.

In certain embodiments, the invention relates to any one of the above-mentioned methods, wherein the biological molecule or biological ion is a protein; and the protein comprises exposed His amino acid residues.

In certain embodiments, the invention relates to any one of the above-mentioned methods, wherein the biological molecule or biological ion is a monoclonal antibody.

In certain embodiments, the invention relates to any one of the above-mentioned methods, wherein the substance is a metal-containing particle, or a metal-containing ion.

In certain embodiments, the invention relates to any one of the above-mentioned methods, wherein the metal-containing particle or metal-containing ion comprises a transition metal, a lanthanide, a poor metal, or an alkaline earth metal.

In certain embodiments, the invention relates to any one of the above-mentioned methods, wherein the metal-containing particle or metal-containing ion comprises a metal selected from the group consisting of nickel, zirconium, lanthanum, cerium, manganese, titanium, cobalt, iron, copper, zinc, silver, gallium, platinum, palladium, lead, mercury, cadmium and gold.

In certain embodiments, the invention relates to any one of the above-mentioned methods, wherein the first fluid is waste water.

In certain embodiments, the invention relates to any one of the above-mentioned methods, wherein the first fluid is waste water from ore refining, or seawater.

In certain embodiments, the invention relates to any one of the above-mentioned methods, wherein the substance is lead or mercury.

In certain embodiments, the invention relates to any one of the above-mentioned methods, wherein the substance is platinum, palladium, copper, gold, or silver.

In certain embodiments, the invention relates to any one of the above-mentioned methods, wherein the fluid is waste water; and the metal-containing particle or metal-containing ion comprises lead or mercury.

In certain embodiments, the invention relates to any one of the above-mentioned methods, wherein the first fluid is waste water from ore refining; and the metal-containing particle or metal-containing ion comprises lead or mercury.

In certain embodiments, the invention relates to any one of the above-mentioned methods, wherein the first fluid is seawater; and the metal-containing particle or metal-containing ion comprises platinum, palladium, copper, gold, or silver.

In certain embodiments, the invention relates to any one of the above-mentioned methods, wherein the first fluid comprises egg white.

In certain embodiments, the invention relates to any one of the above-mentioned methods, wherein the first fluid comprises egg white; and the substance is lysozyme.

In certain embodiments, the invention relates to a method in which, in tangential flow separation mode, no pre-processing of the raw reaction mixtures is required due to the high specificity of the composite materials in the devices of the present invention. In certain embodiments, the invention relates to a method in which separations can be carried out on a large scale. In certain embodiments, the invention relates to a method in which separations can be carried out in a shorter amount of time. In certain embodiments, the invention relates to a method in which the devices have a high binding capacity.

In certain embodiments, the invention relates to a method that comprises two steps—collecting the desired substance onto the composite material and harvesting the desired substance from the composite material.

In certain embodiments, the invention relates to a method of separating a substance from a fluid, comprising the step of:
placing the fluid in contact with a composite material in any one of the above-mentioned wrapped fluid treatment elements, thereby adsorbing or absorbing the substance to the composite material.

In certain embodiments, the invention relates to a method of separating a substance from a fluid, comprising the step of:
placing the fluid in a first opening of any one of the above-mentioned fluid treatment devices, thereby adsorbing or absorbing the substance to the composite material and producing a permeate; and
collecting the permeate from a second opening of the fluid treatment device.

In certain embodiments, the invention relates to the above-mentioned method, wherein the fluid is passed through the macropores of the composite material; and the substance is adsorbed or absorbed within the macropores of the composite material.

In certain embodiments, the invention relates to a method of separating a substance from a fluid, comprising the step of:
placing the fluid in a first opening of any one of the above-mentioned fluid treatment devices, thereby adsorbing or absorbing the substance to the composite material;
collecting the permeate from a second opening of the fluid treatment device;
placing a second fluid in the first opening of the fluid treatment device, thereby releasing the substance from the composite material.

In certain embodiments, the invention relates to the above-mentioned method, wherein the fluid is passed through the macropores of the composite material; the substance is adsorbed or absorbed within the macropores of the composite material; and the second fluid is passed through the macropores of the composite material, thereby releasing the substance from the composite material.

In certain embodiments, the invention relates to any one of the above-mentioned methods, wherein the substance is radioactive.

EXEMPLIFICATION

The invention now being generally described, it will be more readily understood by reference to the following examples, which are included merely for purposes of illustration of certain aspects and embodiments of the present invention, and are not intended to limit the invention.

Example 1

The results comparing a 4-layer wrapped device with a 2.5" pleated membrane device are shown in FIG. 20. These results have been reproduced a number times using S (strong cation exchange) and Q (strong anion exchange) membranes.

Example 2

Fluid flow path provided control:
  for breakthrough characteristics (thinner interleaf, more layers, or larger core=sharper break through)
  for back pressure characteristics (thinner interleaf, more layers, or larger core=higher back pressure)
  for cycling capabilities (flow into the inner core=increased back pressure; flow from the inner core radially outwards=stable back pressure, thus cycling capable)
(Device Volume:Membrane Volume) Ratio Increased Control:
  to improve process throughput (relatively more membrane=fewer cycles to process a fixed quantity; fewer cycles=less time=increased throughput)
  to higher elution titer (reduction of hold-up volume=reduction of device volume=increased titer)
  to decreased buffer usage (reduction of hold-up volume=decreased mixing and dilution=optimized use of buffers)

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A method of separating a substance from a fluid, comprising the steps of:
    placing a first fluid comprising a substance in a first opening of a fluid treatment device, wherein the fluid treatment device comprises a housing unit comprising:
    (a) the first opening and a second opening;
    (b) a fluid flow path between the first opening and the second opening; and
    (c) a wrapped fluid treatment element comprising composite material and interleaf forming layers wrapped around an inner core,
    wherein
    the composite material comprises
        a support member comprising a plurality of pores extending through the support member; and
        a non-self-supporting macroporous cross-linked gel comprising macropores having an average diameter of 10 nm to 3000 nm, said macroporous gel being located in the pores of the support member,
        said macropores of said macroporous cross-linked gel are smaller than said pores of said support member;
    the inner core is a cylinder, wherein the cylinder is capped or sealed at both ends;
    the layer adjacent to the inner core is a first layer of interleaf;
    the first opening is an inlet; and
        the wrapped fluid treatment element is oriented across the fluid flow path such that the first fluid entering the first opening must flow through at least one layer of composite material and at least one layer of interleaf before exiting the second opening, wherein the fluid flow path of the first fluid is radially inward towards the inner core,
        thereby adsorbing or absorbing the substance to the composite material and producing a permeate, which flows along a fluid flow path parallel to the first layer of interleaf to the outlet; and
    collecting the permeate from the second opening of the fluid treatment device.

2. The method of claim 1, wherein the layers are wrapped spirally around the inner core.

3. The method of claim 1, wherein the composite material is in contact with the interleaf.

4. The method of claim 1, wherein the layers are not concentric circles around the inner core.

5. The method of claim 1, wherein the interleaf is screen or a non-woven material.

6. The method of claim 1, wherein the interleaf is mesh.

7. The method of claim 1, wherein the interleaf is polypropylene or polyethylene.

8. The method of claim 1, wherein the interleaf is non-woven polypropylene.

9. The method of claim 1, wherein the interleaf is spun-bound polypropylene.

10. The method of claim 1, wherein the interleaf is paper.

11. The method of claim 1, wherein the inner core is plastic.

12. The method of claim 1, wherein the inner core is polypropylene.

13. The method of claim 1, wherein the housing unit is substantially cylindrical.

14. The method of claim 1, wherein the housing unit is disposable or reusable.

15. The method of claim 1, wherein the housing unit is plastic or stainless steel.

16. The method of claim 1, wherein the device comprises a sensor.

* * * * *